(12) United States Patent
Choi et al.

(10) Patent No.: US 12,531,445 B2
(45) Date of Patent: *Jan. 20, 2026

(54) WIRELESS POWER TRANSMITTING DEVICE AND COMMUNICATION METHOD BY WIRELESS POWER TRANSMITTING DEVICE

(71) Applicant: LG ELECTRONICS INC., Seoul (KR)

(72) Inventors: Jingu Choi, Seoul (KR); Minsoo Lee, Seoul (KR); Hongwon Lee, Seoul (KR); Jinkwon Lim, Seoul (KR); Jaehyu Kim, Seoul (KR); Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,129

(22) Filed: Jul. 1, 2024

(65) Prior Publication Data

US 2024/0356386 A1 Oct. 24, 2024

Related U.S. Application Data

(63) Continuation of application No. 17/908,463, filed as application No. PCT/KR2021/002639 on Mar. 4, 2021, now Pat. No. 12,046,927.

(30) Foreign Application Priority Data

Mar. 4, 2020 (KR) .......................... 10-2020-0027028

(51) Int. Cl.
*H02J 50/80* (2016.01)
*H02J 50/12* (2016.01)
(Continued)

(52) U.S. Cl.
CPC ............... *H02J 50/80* (2016.02); *H02J 50/12* (2016.02); *H02J 50/40* (2016.02); *H04L 27/12* (2013.01)

(58) Field of Classification Search
CPC . H02J 50/80; H02J 50/12; H02J 50/40; H04L 27/12; H04L 1/188; H04L 1/0002
(Continued)

(56) References Cited

U.S. PATENT DOCUMENTS 12,046,927 B2 * 7/2024 Choi ....................... H02J 50/80
2021/0044152 A1 * 2/2021 Park ....................... H02J 50/10
2021/0320745 A1 * 10/2021 Kim ....................... H02J 50/402

* cited by examiner

*Primary Examiner* — Richard Tan
(74) *Attorney, Agent, or Firm* — BRYAN CAVE LEIGHTON PAISNER LLP

(57) ABSTRACT

A device for transmission of wireless power according to an embodiment of the present specification comprises: a power conversion circuit for transmitting the wireless power to a wireless power receiving device; and a communication/control circuit for communicating with the wireless power receiving device and controlling the wireless power, wherein the communication/control circuit transmits a response to a reception data packet received from the wireless power receiving device or a transmission data packet transmitted to the wireless power receiving device on the basis of a timeout period, and the timeout period is changed according to a communication speed between the communication/control circuit and the wireless power receiving device.

10 Claims, 28 Drawing Sheets

(51) Int. Cl.
*H02J 50/40* (2016.01)
*H04L 27/12* (2006.01)
(58) Field of Classification Search
USPC .......................................................... 307/104
See application file for complete search history.

FIG. 3b

|  | b7 | b6 | b5 | b4 | b3 | b2 | b1 | b0 |
|---|---|---|---|---|---|---|---|---|
| Byte 0 | colspan=8 Application Profile |
| Byte 1 | Version |
| Byte 2-N-1 | Profile-specific data |

FIG. 10

|  | b7 | b6 | b5 | b4 | b3 | b2 | b1 | b0 |
|---|---|---|---|---|---|---|---|---|
| B0 | Power Class | | Guaranteed Power Value | | | | | |
| B1 | Reserved | | | Potential Power Value | | | | |
| B2 | AI | AR | OB | Reserved | | | WPID | Not Res Sens |

FIG. 11

| | b7 | b6 | b5 | b4 | b3 | b2 | b1 | b0 |
|---|---|---|---|---|---|---|---|---|
| B0 | Power Class | Maximum Power value | | | | | | |
| B1 | Reserved | | | | | | | |
| B2 | Prop | AI | AR | OB | ZERO | | | |
| B3 | Window Size | | | | | Window Offset | | |
| B4 | Neg | Polarity* | Depth* | | | Reserved | | |

FIG. 15

| | Request | Parameter |
|---|---|---|
| $b_0$ | | |
| $b_1$ | | |
| $b_2$ | | |
| $b_3$ | | |
| $b_4$ | | |
| $b_5$ | | |
| $b_6$ | | |
| $b_7$ | | |
| | $B_0$ | $B_1$ |

FIG. 16

| $b_0$ | $b_1$ | $b_2$ | $b_3$ | $b_4$ | $b_5$ | $b_6$ | $b_7$ |
|---|---|---|---|---|---|---|---|
| Depth | | Polarity | NCYCLES | | Reserved | | |
| | | | | | | | $B_0$ |

WIRELESS POWER TRANSMITTING DEVICE AND COMMUNICATION METHOD BY WIRELESS POWER TRANSMITTING DEVICE

This application is a Continuation application of U.S. patent application Ser. No. 17/908,463, filed on Aug. 31, 2022, which is a National Stage of International Application No. PCT/KR2021/002639, filed on Mar. 4, 2021, which claims the benefit of Korean Application No. 10-2020-0027028, filed on Mar. 4, 2020, the contents of which are all hereby incorporated by reference herein in their entirety.

BACKGROUND OF THE DISCLOSURE

Field of the Disclosure

The present specification relates to a wireless power transmitter for transmitting wireless power to a wireless power receiver, and a communication method with the wireless power receiver by the wireless power transmitter.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

An object of the present specification is to provide a communication method by a wireless power transmitter and a wireless power transmitter in which a time limit required for a response and/or data packet transmitted to or received from a counterpart device is changed based on a change in the communication speed between the wireless power transmitter and the wireless power receiver.

Alternatively, an object of the present specification is to provide an efficient authentication method between a wireless power transmitter and a wireless power receiver.

The technical problems of the present specification are not limited to the problems mentioned above, and other problems not mentioned will be clearly understood by those skilled in the art from the following description.

A wireless power transmitter according to an embodiment of the present specification for solving the above problems comprising a power conversion circuit configured to transfer the wireless power to the wireless power receiver and a communication/control circuit configured to communicate with the wireless power receiver and control the wireless power, wherein the communication/control circuit is configured to transmit a response for a received data packet received from the wireless power receiver based on a timeout time or a transmission data packet transmitted to the wireless power receiver, and wherein the timeout time is changed according to a communication speed between the communication/control circuit and the wireless power receiver.

A communication method with a wireless power receiver by a wireless power transmitter according to an embodiment of the present specification for solving the above problems comprising transmitting a response for a received data packet received from the wireless power receiver based on a timeout time or a transmission data packet transmitted to the wireless power receiver, wherein the timeout time is changed according to a communication speed between the wireless power transmitter and the wireless power receiver.

Specific features of the present specification are described below.

By changing the time limit required for a response and/or data packet transmitted to or received from the counterpart device based on the change in the communication speed between the wireless power transmitter and the wireless power receiver, efficient operation of protocols related to wireless charging is possible.

Alternatively, efficient authentication between the wireless power transmitter and the wireless power receiver is possible.

Effects according to the present specification are not limited by the contents exemplified above, and more various effects are included in the present specification.

BRIEF DESCRIPTION OF THE DRAWINGS

FIG. 3b shows an example of a WPC NDEF in a wireless power transfer system.

FIG. 10 is a capability packet structure of a wireless power transmitter according to an exemplary embodiment of the present disclosure.

FIG. 11 is a configuration packet structure of a wireless power receiver according to an exemplary embodiment of the present disclosure.

FIG. 15 is a diagram illustrating a format of a message field of an SRQ according to an example.

FIG. 16 is a diagram illustrating a format of a parameter field of an SRQ according to an example for requesting a change of characteristic information related to FSK.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
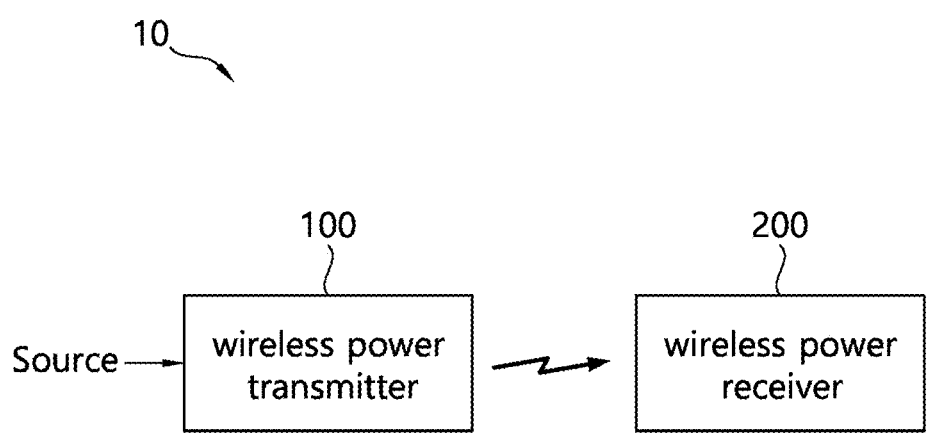
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source(S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
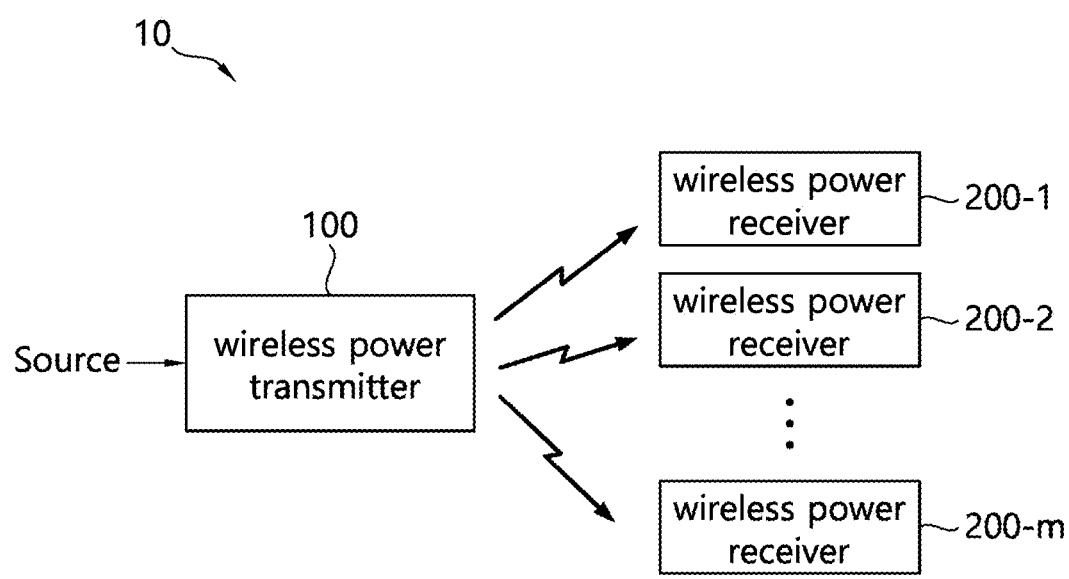
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
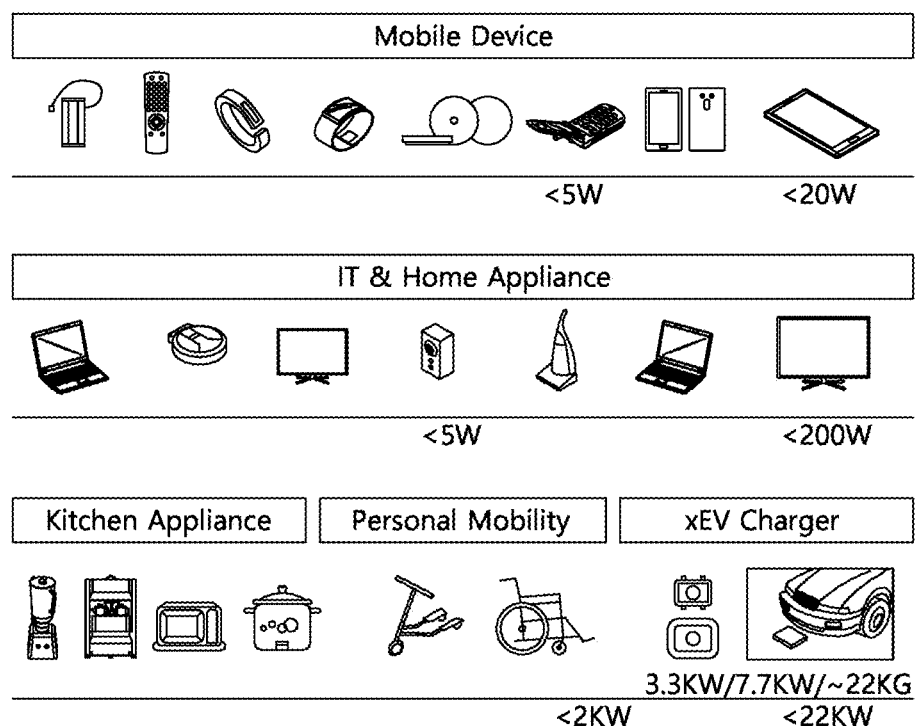
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmission and reception devices may provide a very convenient user experience and interface (UX/UI). That is, a smart wireless charging service may be provided. The smart wireless charging service may be implemented based on the UX/UI of a smartphone including a wireless power transmitter. For these applications, the interface between the smartphone's processor and the wireless charging receiver allows "drop and play" bidirectional communication between the wireless power transmitter and the receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_IN\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the PTX_IN_MAX of the corresponding class. The PRU cannot draw a power that is higher than the power level specified in the corresponding category.

Figure 4A:
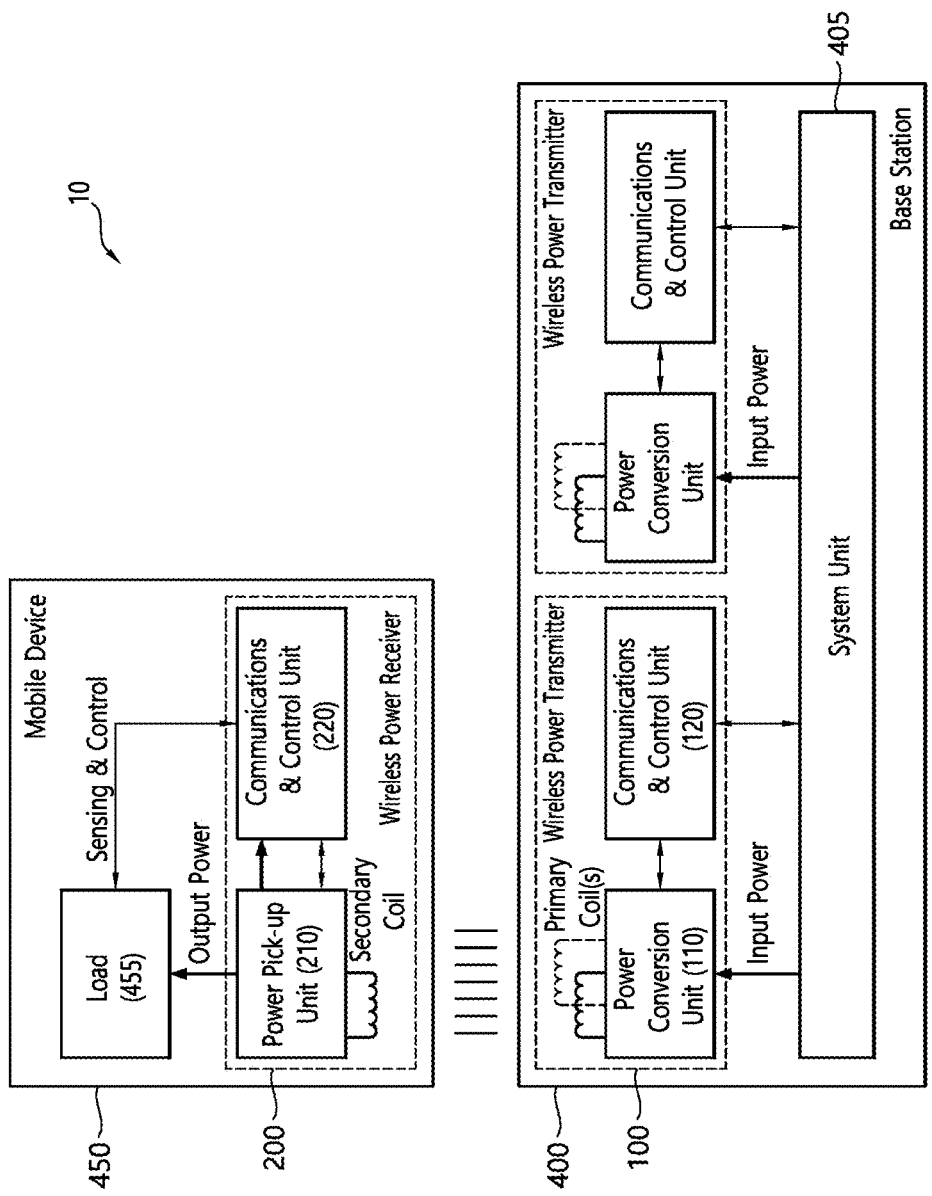
FIG. 4a is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220)

may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
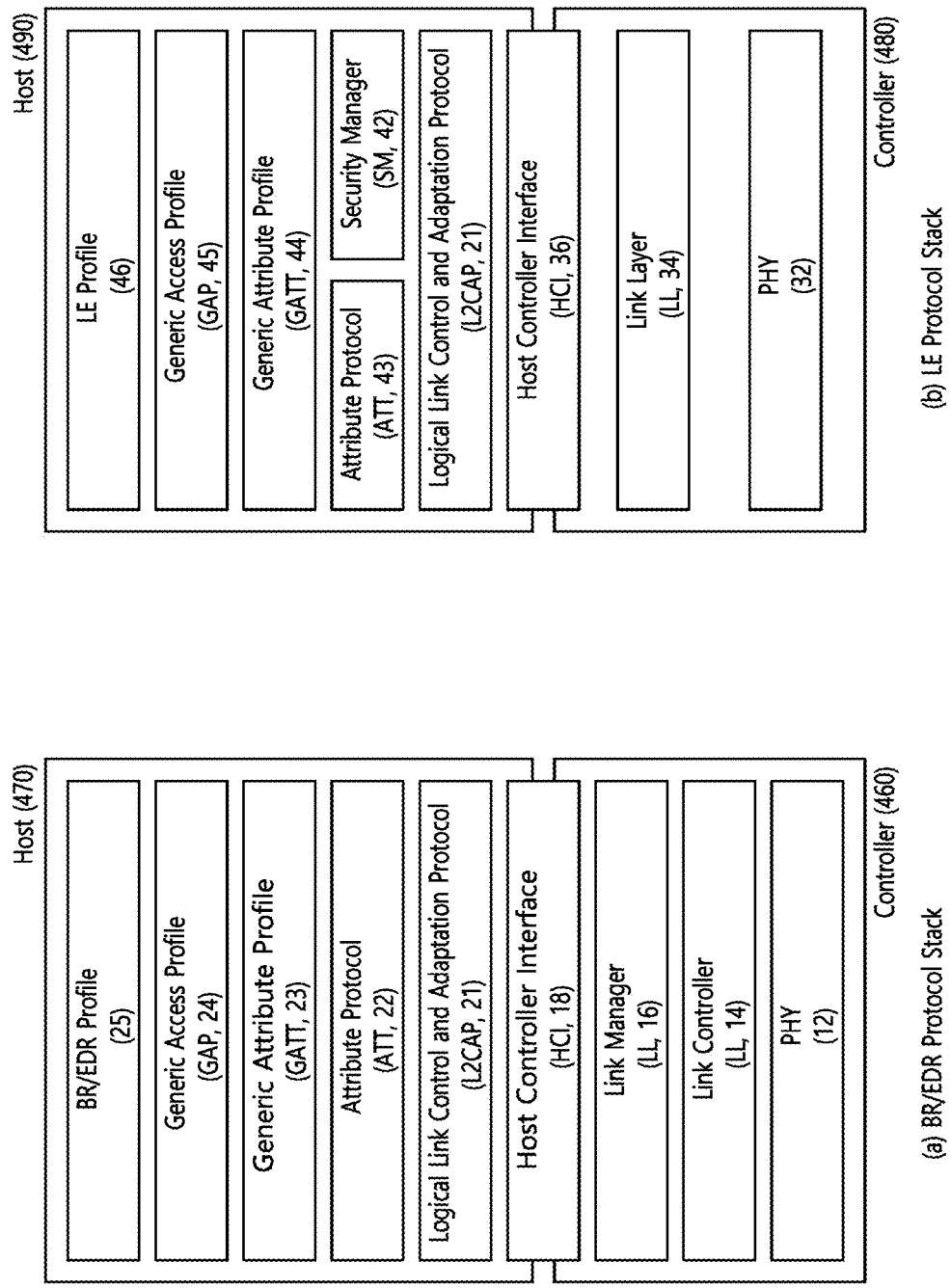
FIG. 4b is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4b.

FIG. 4b is a diagram illustrating an example of a Bluetooth communication architecture to which an embodiment according to the present disclosure may be applied.

Referring to FIG. 4b, (a) of FIG. 4b shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4b, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4b, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method
② Time: Time information exchanging method
③ FindMe: Provision of alarm service according to distance
④ Proximity: Battery information exchanging method
⑤ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4a, The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
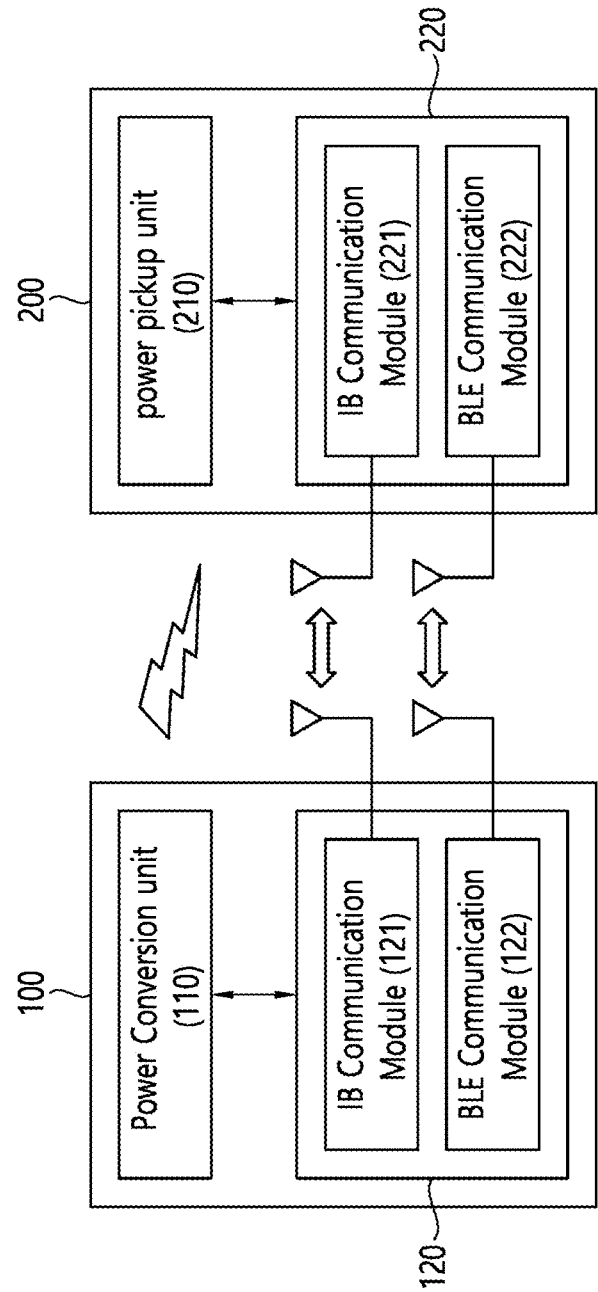
FIG. 4c is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4c.

FIG. 4c is a block diagram illustrating a wireless power transfer system using BLE communication according to an example.

Referring to FIG. 4c, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4*b*. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
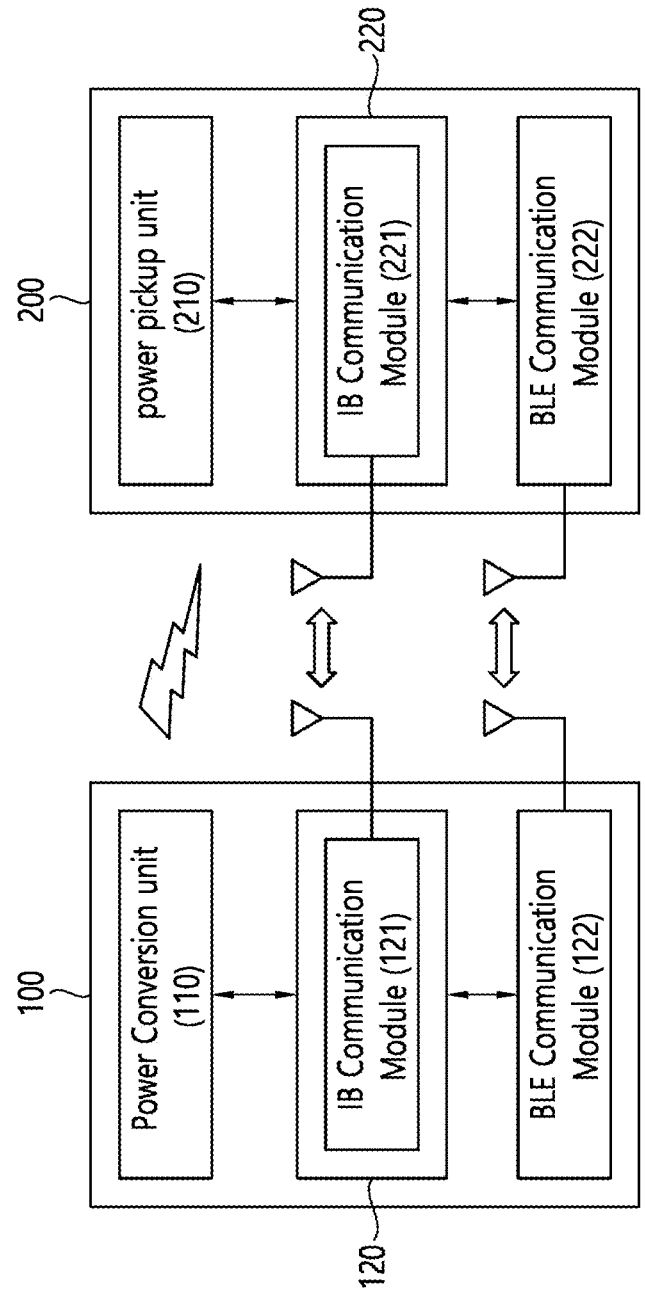
FIG. 4d is a block diagram illustrating a wireless power transfer system using BLE communication according to another example.

FIG. 4*d* is a block diagram illustrating a wireless power transfer system using BLE communication according to another example.

Referring to FIG. 4*d*, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
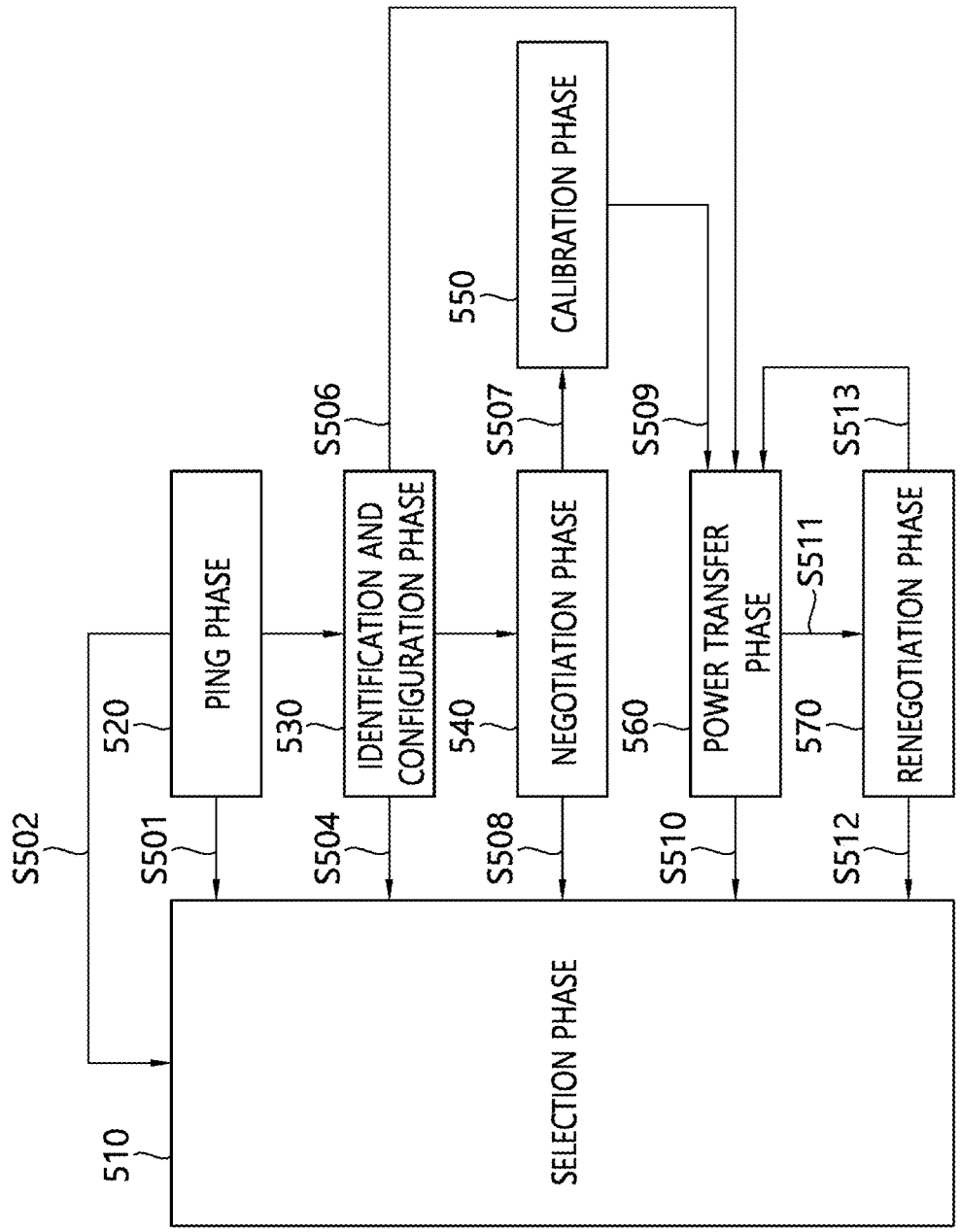
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
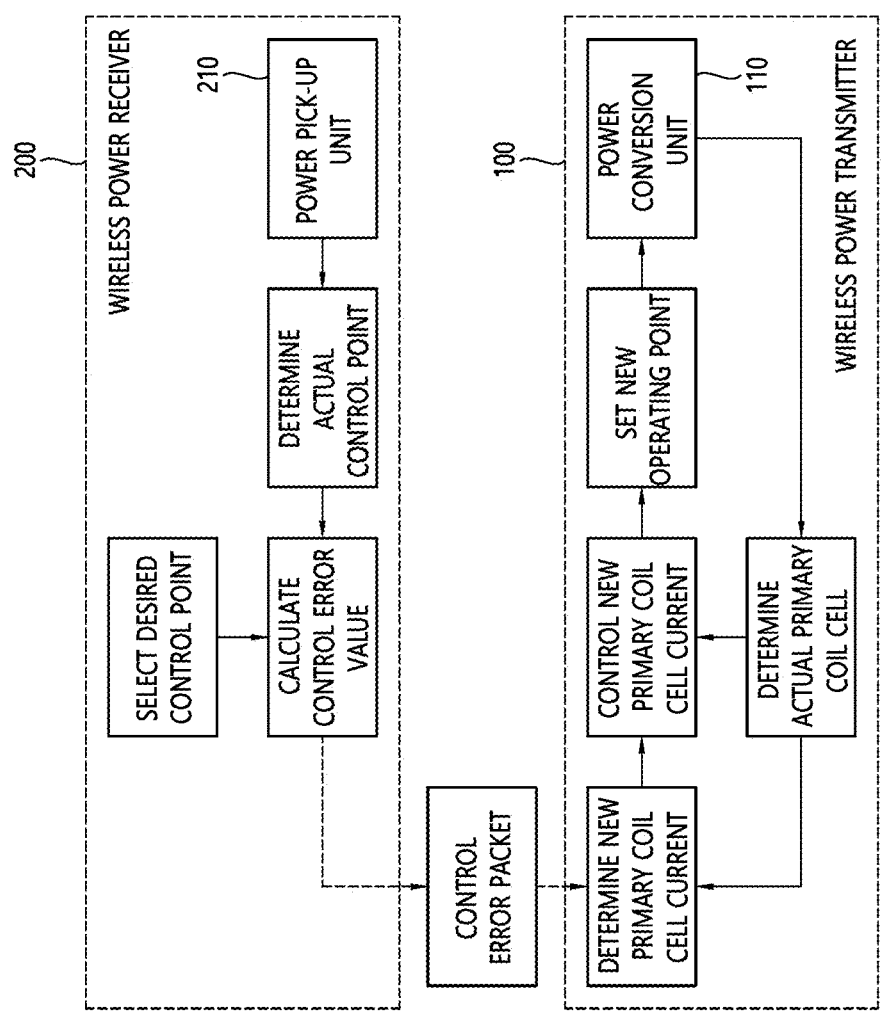
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point-amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
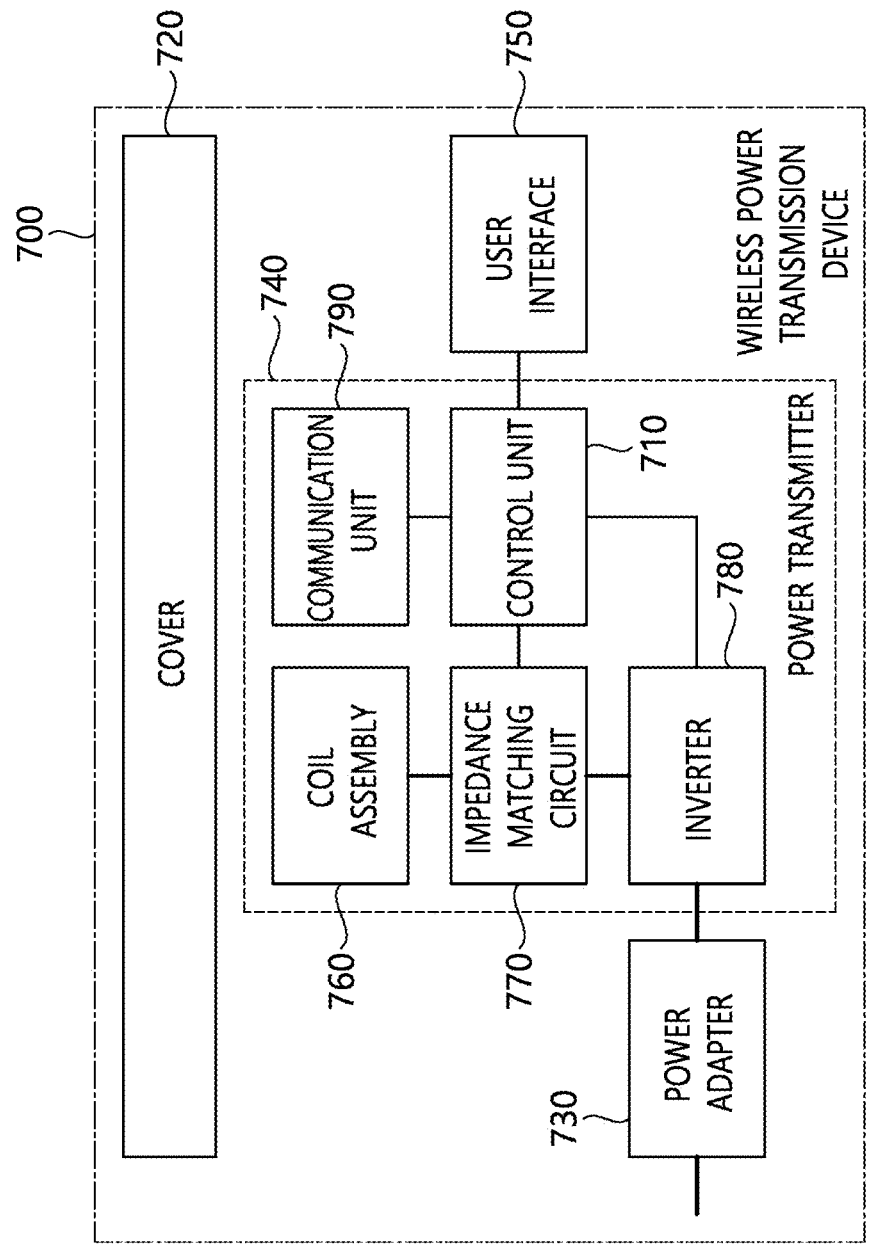
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
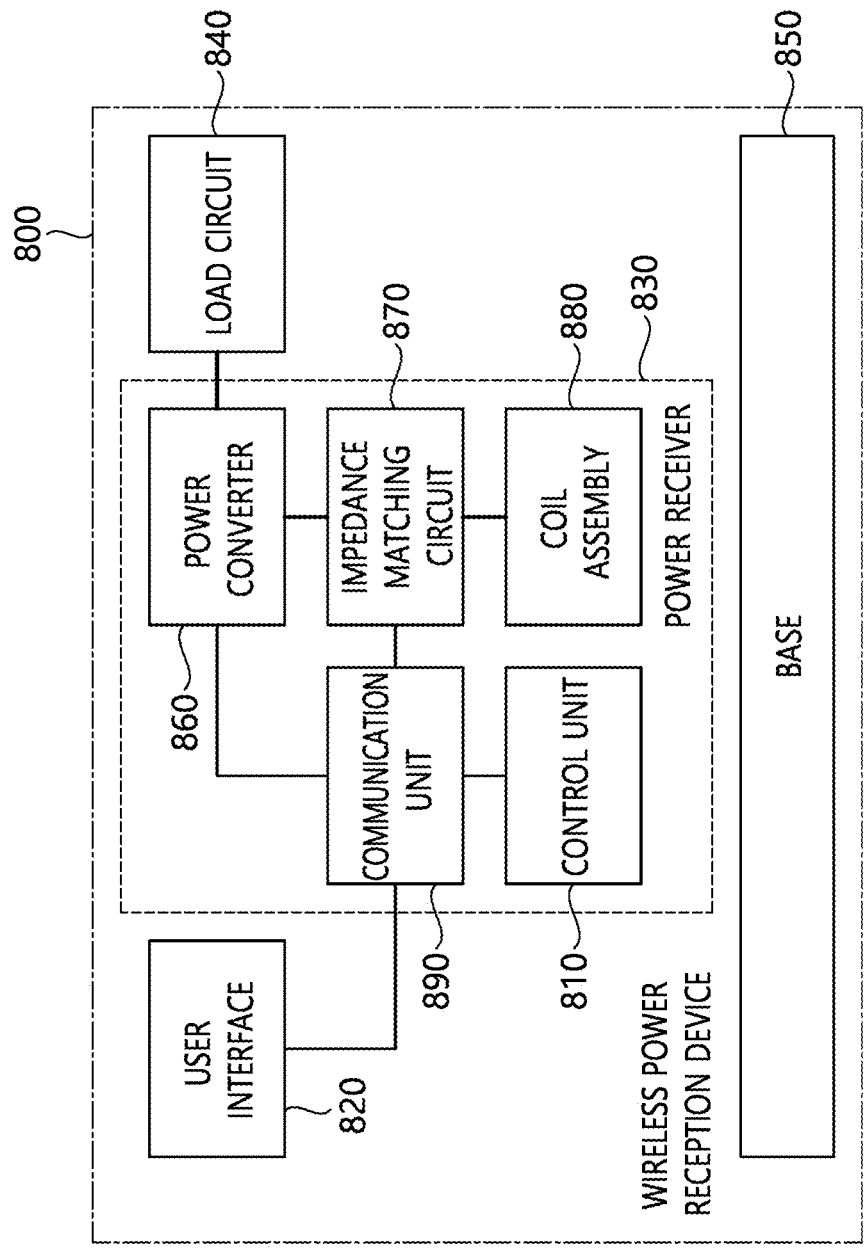
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
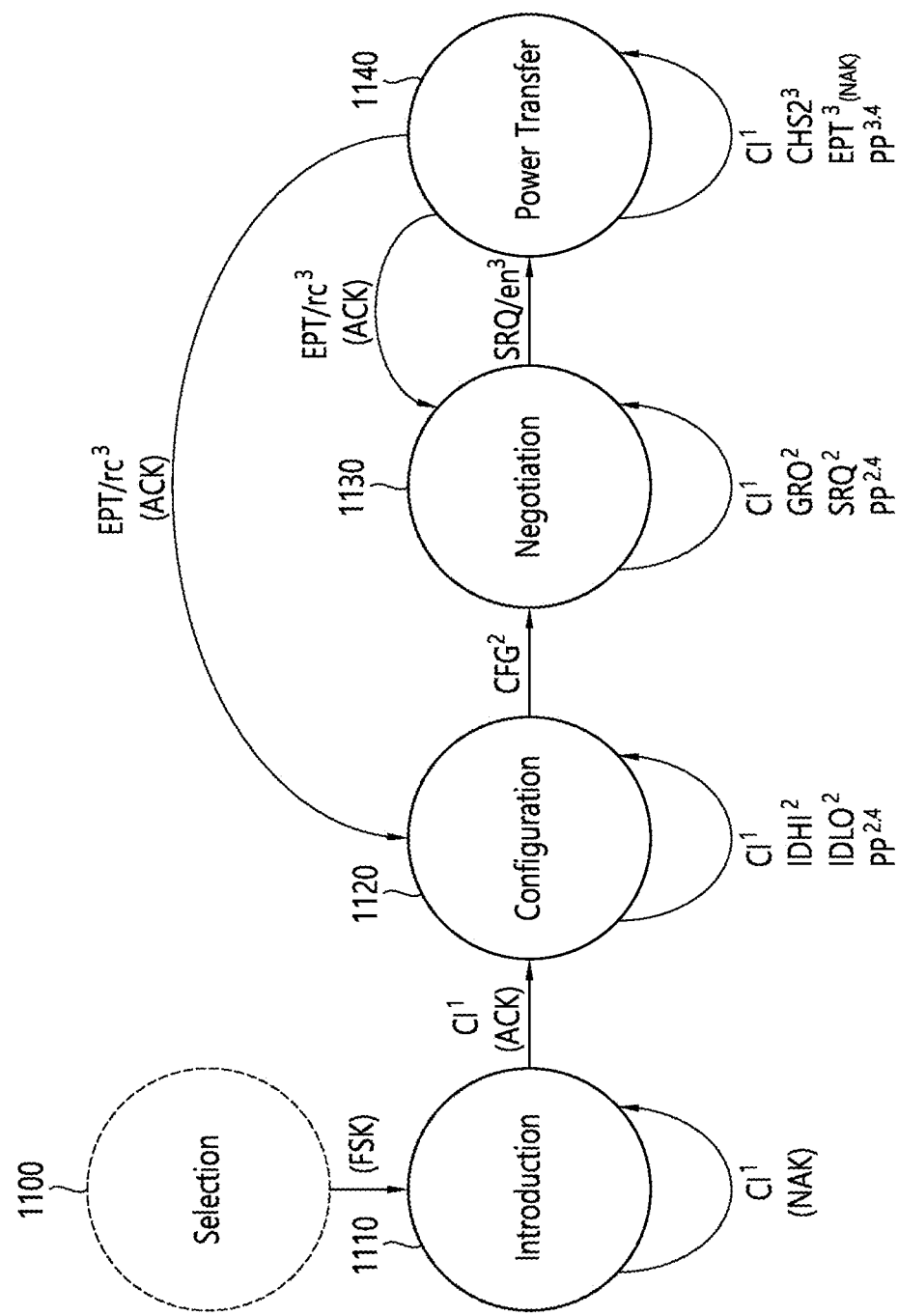
FIG. 9 is a diagram illustrating operation states of a wireless power transmitter and a wireless power receiver in a shared mode according to an embodiment.

FIG. 9 is a diagram illustrating operation states of a wireless power transmitter and a wireless power receiver in a shared mode according to an embodiment.

Referring to the FIG. 9, the wireless power receiver operating in the shared mode may operate in any one of selection Phase (1100), introduction Phase 1110, configuration Phase (1120), Negotiation Phase (1130) and Power Transfer Phase (1140).

First, the wireless power transmitter according to an embodiment may transmit a wireless power signal to detect the wireless power receiver. That is, the process of detecting the wireless power receiver using the wireless power signal may be referred to as analog ping.

Meanwhile, the wireless power receiver receiving the wireless power signal may enter the selection state 1100. As described above, the wireless power receiver entering the selection state 1100 may detect the presence of an FSK signal on the wireless power signal.

That is, the wireless power receiver may perform communication in either the exclusive mode or the shared mode according to the presence of the FSK signal.

More specifically, if the wireless power signal includes the FSK signal, the wireless power receiver may operate in the shared mode, otherwise, the wireless power receiver may operate in the exclusive mode.

When the wireless power receiver operates in the shared mode, the wireless power receiver may enter the introduction state 1110. In the introduction phase 1110, the wireless power receiver may transmit a control information packet to the wireless power transmitter in order to transmit a control information packet (CI) in the configuration phase, the negotiation phase, and the power transfer phase. The control information packet may have a header and control-related information. For example, the control information packet may have a header of 0X53.

In the Introduction phase 1110, the wireless power receiver attempts to request a free slot to transmit a control information (CI) packet over the following configuration, negotiation, and power transmission phases. At this time, the wireless power receiver selects a free slot and transmits the first CI packet. If the wireless power transmitter responds with ACK to the CI packet, the wireless power transmitter enters the configuration phase. If the wireless power transmitter responds with a NAK, another wireless power receiver is in progress through the configuration and negotiation phase. In this case, the wireless power receiver retryes the request for a free slot.

If the wireless power receiver receives the ACK in response to the CI packet, the wireless power receiver determines the position of a private slot in the frame by counting the remaining slot sinks up to the first frame sync. In all subsequent slot-based frames, the wireless power receiver transmits the CI packet through the corresponding slot.

If the wireless power transmitter allows the wireless power receiver to proceed to the configuration phase, the wireless power transmitter provides a series of locked slots for exclusive use of the wireless power receiver. This ensures that the wireless power receiver goes through the configuration phase without collision.

The wireless power receiver transmits sequences of data packets such as two identification data packets (IDHI and IDLO) using a lock slot. Upon completion of this phase, the wireless power receiver enters the negotiation phase. In the negotiation phase, the wireless power transmitter continues to provide a lock slot for exclusive use to the wireless power receiver. This ensures that the wireless power receiver proceeds with the negotiation phase without collision.

The wireless power receiver transmits one or more negotiation data packets using the corresponding lock slot, which may be mixed with private data packets. Eventually, the sequence ends with a specific request (SRQ) packet. Upon completion of the sequence, the wireless power receiver enters a power transmission phase, and the wireless power transmitter stops providing the lock slot.

In the power transmission phase, the wireless power receiver transmits the CI packet using the allocated slot and receives power. The wireless power receiver may include a regulator circuit. The regulator circuit may be included in the communication/control circuit. The wireless power receiver may self-regulate the reflection impedance of the wireless power receiver through a regulator circuit. In other words, the wireless power receiver may adjust the impedance reflected in order to transmit the amount of power required by the external load. This can prevent excessive power reception and overheating.

In the shared mode, since the wireless power transmitter may not perform power adjustment in response to the received CI packet (according to the operation mode), in this case, control to prevent an overvoltage state may be required.

Hereinafter, authentication between a wireless power transmitter and a wireless power receiver will be disclosed.

The wireless power transfer system using in-band communication may use USB-C authentication. The authentication may include an authentication of the wireless power transmitter that is performed by the wireless power receiver (i.e., PTx Authentication by PRx), and an authentication of the wireless power receiver that is performed by the wireless power transmitter (PRx Authentication by PTx).

The wireless power transmitter may notify (or announce) whether or not it supports the authentication function to the wireless power receiver by using a capability packet (in case of an authentication of the wireless power transmitter by the wireless power receiver (authentication of PTx by PRx)). Meanwhile, the wireless power receiver may notify (or announce) whether or not it supports the authentication function to the wireless power transmitter by using a capability packet (in case of an authentication of the wireless power receiver by the wireless power transmitter (authentication of PRx by PTx)). Hereinafter, a structure of indication information (a capability packet and a configuration packet) related to whether or not a device supports the authentication function will be disclosed and described in detail.

FIG. 10 is a capability packet structure of a wireless power transmitter according to an exemplary embodiment of the present disclosure.

Referring to FIG. 10, a capability packet having a respective header value of 0X31 is assigned with 3 bytes. Herein, a first byte (B0) includes a power class and a guaranteed power value, a second byte (B1) includes a reserved field and a potential power field, and a third byte (B2) includes an Authentication Initiator (AI), an Authentication Responder (AR), a reserved field, a WPID, and a Not Res Sens field. More specifically, the Authentication Initiator (AI) is assigned with 1 bit. Herein, for example, if the value is equal to '1b', this may indicate that the corresponding wireless power transmitter may operate as the authentication initiator. Additionally, the Authentication Responder (AR) is also assigned with 1 bit. Herein, for example, if the value is equal to '1b', this may indicate that the corresponding wireless power transmitter may operate as the authentication responder.

FIG. 11 is a configuration packet structure of a wireless power receiver according to an exemplary embodiment of the present disclosure.

Referring to FIG. 11, a capability packet having a respective header value of 0X51 is assigned with 5 bytes. Herein, a first byte (B0) includes a power class and a maximum power value, a second byte (B1) includes an AI, an AR, a reserved field, a third byte (B2) includes a Prop, a reserved field, a ZERO field, and a Count field, a fourth value (B3) includes a Window size and a window offset, and a fifth byte (B4) includes a Neg field, a polarity field, a Depth field, an authentication field (Auth), and a reserved field. More specifically, the Authentication Initiator (AI) is assigned with 1 bit. Herein, for example, if the value is equal to '1b', this may indicate that the corresponding wireless power receiver may operate as the authentication initiator. Additionally, the Authentication Responder (AR) is also assigned with 1 bit. Herein, for example, if the value is equal to '1b', this may indicate that the corresponding wireless power receiver may operate as the authentication responder.

A message that is used during the authentication procedure is referred to as an authentication message. The authentication message is used for carrying information related to authentication. Herein, 2 different types of authentication messages exist. One type corresponds to an authentication request, and another type corresponds to an authentication response. The authentication request is transmitted by the authentication initiator, and the authentication response is transmitted by the authentication responder. Both the wireless power transmitter and the wireless power receiver may be the authentication initiator or the authentication responder. For example, in case the wireless power transmitter is the authentication initiator, the wireless power receiver becomes the authentication responder. And, in case the wireless power receiver is the authentication initiator, the wireless power transmitter becomes the authentication responder.

An authentication request message includes a GET_DIGESTS (i.e., 4 bytes), a GET_CERTIFICATE (i.e., 8 bytes), and a CHALLENGE (i.e., 36 bytes).

An authentication response message includes a DIGESTS (i.e., 4+32 bytes), a CERTIFICATE (i.e., 4+certificate chain (3×512 bytes)=1,540 bytes), a CHALLENGE_AUTH (i.e., 168 bytes), and an ERROR (i.e., 4 bytes).

An authentication message may be referred to as an authentication packet and may also be referred to as authentication data or authentication control information. Additionally, messages, such as GET_DIGEST, DIGESTS, and so on, may also be referred to as a GET_DIGEST packet, a DIGEST packet, and so on.

Figure 12:
FIG. 12 shows an application-level data stream between a wireless power transmitter and a receiver according to an example.

FIG. 12 shows an application-level data stream between a wireless power transmitter and a receiver according to an example.

Referring to FIG. 12, a data stream may include an auxiliary data control (ADC) data packet and/or an auxiliary data transport (ADT) data packet.

The ADC data packet is used to open a data stream. The ADC data packet may indicate the type of a message included in a stream and the number of data bytes. Meanwhile, the ADT data packet is sequences of data including an actual message. An ADC/end data packet is used to indicate the end of the stream. For example, the maximum number of data bytes in a data transport stream may be limited to 2047.

ACK or NAC (NACK) is used to indicate whether the ADC data packet and the ADT data packet are normally received. Control information necessary for wireless charging such as a control error packet (CE) or DSR may be transmitted between transmission timings of the ADC data packet and the ADT data packet.

Using this data stream structure, authentication related information or other application level information may be transmitted and received between the wireless power transmitter and the wireless power receiver.

Hereinafter, a method for improving the in-band communication speed between the wireless power transmitter and the wireless power receiver will be described.

According to the wireless charging standards (Qi) regulated by the Wireless Power Consortium (WPC), the wireless power receiver transmits data to the wireless power transmitter through in-band communication using ASK (amplitude shift keying), and the wireless power transmitter transmits data to the wireless power receiver through in-band communication using Frequency-Shift Keying (FSK).

ASK is an amplitude shift keying method and expresses one data bit ('0'b or '1'b) using a change in amplitude, and FSK is a frequency shift keying method and expresses one data bit ('0'b or '1'b) using a change in operating frequency.

According to the current WPC Qi standard, the wireless power transmitter communicates with the wireless power receiver using FSK that modulates the operating frequency of the wireless power signal. The wireless power transmitter switches an operating frequency between an operating frequency $f_{op}$ in an unmodulated state and an operating frequency $f_{mod}$ in a modulated state.

According to the current WPC Qi specification, the difference between $f_{op}$ and $f_{mod}$ is specified as polarity and depth.

Polarity is information on FSK polarity, and is an index indicating whether the difference between $f_{op}$ and $f_{mod}$ is positive or negative. A Pol value of 0 means positive, and 1 means negative. If the polarity is positive, it can mean that $f_{mod}$ is larger than $f_{op}$, and when it is negative, it can mean that $f_{mod}$ is smaller than $f_{op}$.

Depth is an index indicating how much the frequency difference between the operating frequency and the modulation frequency is, and the larger the depth value, the greater the frequency difference, and the smaller the depth value, the smaller the frequency difference.

Figure 13:
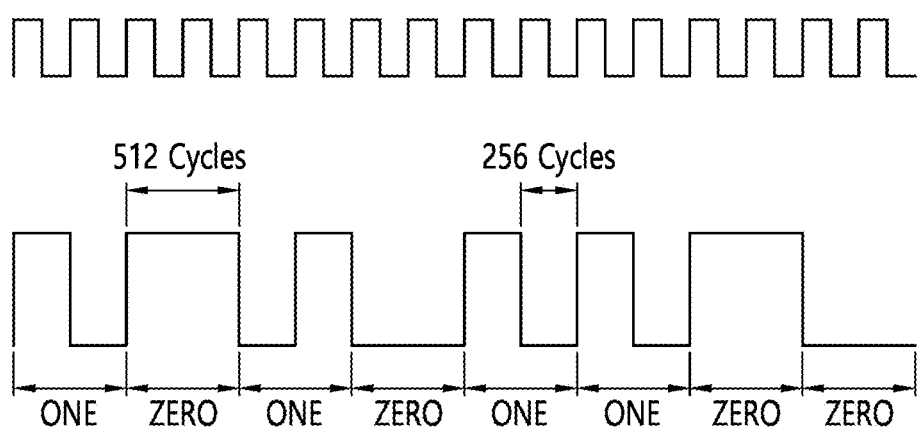
FIG. 13 is a diagram for explaining an FSK encoding method according to an example according to the current WPC Qi standard.

FIG. 13 is a diagram for explaining an FSK encoding method according to an example according to the current WPC Qi standard.

Referring to FIG. 13, the wireless power transmitter must align one data bit at 512 cycles of the operating frequency. The wireless power transmitter encodes '0'b using one transition and encodes '1'b using two transitions. To encode '1'b, the first transition occurs at the beginning of the corresponding bit, and the second transition occurs at 256 cycles of the corresponding bit.

FSK according to the current WPC Qi standard has a bandwidth limited to a maximum of 200 bps at an operating frequency of 100 KHz. However, the FSK speed according to the current WPC Qi standard is relatively slow compared to the ASK speed (about 2 kbps), when authentication between the wireless power receiver and the wireless power transmitter is required, the FSK speed according to the current WPC Qi standard is too slow to process data required for authentication.

As described above, in FSK according to the current WPC Qi standard, one bit is encoded in 512 cycles. Accordingly, if the number of cycles of the operating frequency for encoding one bit is reduced to less than 512, the speed of FSK can be improved. Therefore, according to the encoding capability of the wireless power transmitter and the decoding capability of the wireless power receiver, the number of cycles of the power signal frequency required to encode one bit is reduced from 512 to 256, 126, 64, 32 or 16, etc., thereby improving and adjusting the FSK speed.

To this end, the characteristic information of the FSK needs to additionally include a new parameter (Number of Cycles, NCYCLES), which means the number of cycles of an operating frequency required to encode one bit, in addition to the above-described polarity and depth.

The wireless power receiver may transmit a data packet including information on NCYLCES to the wireless power transmitter to adjust the FSK speed of the wireless power transmitter. The wireless power transmitter also transmits a data packet including information on NCYLCES to the wireless power receiver to control the FSK speed and at the same time allow the wireless power receiver to accurately decode the transmitted data using the FSK.

Figure 14:
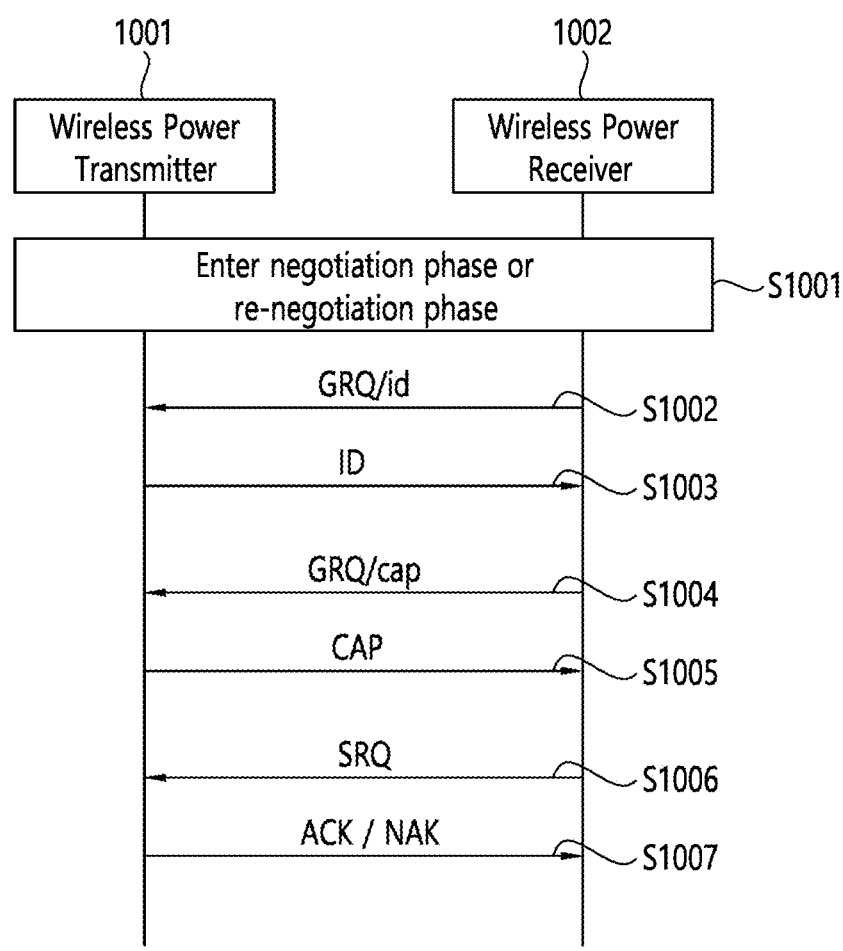
FIG. 14 is a flowchart illustrating a protocol of a negotiation phase or a renegotiation phase according to an embodiment.

FIG. 14 is a flowchart illustrating a protocol of a negotiation phase or a renegotiation phase according to an embodiment.

Referring to FIG. 14, the wireless power transmitter 1001 and the wireless power receiver 1002 may enter a negotiation phase or a re-negotiation phase (S1001).

Although not shown in FIG. 14, The wireless power transmitter 1001 and the wireless power receiver 1002 may enter a negotiation phase (Negotiation Phase) through a ping phase and a configuration phase, or the wireless power transmitter 1001 and the wireless power receiver 1002 may enter a power transfer phase through a ping phase, a configuration phase, and a negotiation phase, and then enter a re-negotiation phase.

In the ping phase, the wireless power transmitter 1001 identifies the wireless power receiver 1002 by transmitting a digital ping. In addition, the wireless power transmitter 1001 may perform foreign object detection before power transmission in order to check whether a foreign object exists in an operating volume. The wireless power receiver 1002 receiving the digital ping transmits a signal strength data packet (SIG) to the wireless power transmitter 1001, the wireless power transmitter 1001 receiving the SIG from the wireless power receiver 1002 may identify that the wireless power receiver 1002 is located in an operating volume.

In the configuration phase, the wireless power receiver 1002 transmits its identification information to the wireless power transmitter, the wireless power receiver 1002 and the wireless power transmitter 1001 may establish a baseline power transfer contract. The wireless power receiver 1002 may transmit an identification data packet (ID) and an extended identification data packet (XID) to the wireless power transmitter 1001 to identify itself, and for a power transfer contract, a power control hold-off data packet (PCH) and a configuration data packet (CFG) may be transmitted to the wireless power transmitter 1001.

Reference Power, whether to support simultaneous data reception/transmission (Dup), whether or not the authentication function is supported (AI), out-band communication support (OB), information on whether Extended Protocol is supported (Neg), etc. may be included in the CFG of the wireless power receiver 1002 transmitted to the wireless power transmitter 1001, and in particular, information on polarity (Pol) and depth related to FSK may be included. The wireless power transmitter 1001 performs in-band communication with the wireless power receiver 1002 using FSK based on information on polarity and depth included in the CFG received from the wireless power receiver 1002.

Polarity and depth are elements of a power transfer contract between the wireless power transmitter 1001 and the wireless power receiver 1002 established in the configuration phase, and it is an element of the power transfer contract that can be negotiated in the negotiation phase or renegotiation phase, which will be described later.

In the negotiation phase, expand or change a power transfer contract (Power Transfer Contract) related to the reception/transmission of wireless power between the wireless power receiver 1002 and the wireless power transmitter 1001, or a renewal of the power transfer contract may be made which adjusts at least some of the elements of the power transfer contract.

Since other details of the ping phase, the configuration phase, and the negotiation phase have been described in FIG. 5 and the like, additional descriptions thereof will be omitted.

Referring to FIG. 14, in the negotiation phase or renegotiation phase, the wireless power receiver 1002 may receive an identification data packet (ID) and a capabilities data packet (CAP) of the wireless power transmitter 1001 using a general request data packet (GRQ).

The GRQ packet includes a 1-byte Requested Power Transmitter Data Packet field (a data packet field of the requested wireless power transmitter). The Requested Power Transmitter Data Packet field may include a header value of a data packet that the wireless power receiver 1002 requests from the wireless power transmitter 1001 using the GRQ packet. For example, when the wireless power receiver 1002 requests the ID packet of the wireless power transmitter 1001 using the GRQ packet, the wireless power receiver 1002 transmits a GRQ packet (GRQ/id) including a header value (0x30) of the ID packet of the wireless power transmitter 1001 in the Requested Power Transmitter Data Packet field.

In the negotiation phase or renegotiation phase, the wireless power receiver 1002 may transmit a GRQ packet (GRQ/id) requesting the ID packet of the wireless power transmitter 1001 to the wireless power transmitter 1001 (S1002).

The wireless power transmitter 1001 receiving the GRQ/id may transmit the ID packet to the wireless power receiver 1002 (S1003). The ID packet of the wireless power transmitter 1001 includes information on the Manufacturer Code. The ID packet including information on the Manufacturer Code allows the manufacturer of the wireless power transmitter 1001 to be identified.

The wireless power receiver 1002 may transmit a GRQ packet (GRQ/cap) requesting the CAP packet of the wireless power transmitter 1001 to the wireless power transmitter 1001 (S1004). The Requested Power Transmitter Data Packet field of the GRQ/cap may include a header value (0x31) of the CAP packet.

The wireless power transmitter 1001 receiving the GRQ/cap may transmit the CAP packet to the wireless power receiver 1002 (S1005). The CAP packet of the wireless power transmitter 1001 includes information related to the performance of the wireless power transmitter 1001. For example, in the CAP packet of the wireless power transmitter 1001, information for negotiable load power, potential load power, simultaneous data reception/transmission support (Dup), authentication function support (AR), out-band communication support (OB), etc. may be included.

In the negotiation phase or renegotiation phase, using a SRQ (Specific Request data packet), the wireless power receiver 1002 may update elements of a power transfer contract related to power to be provided in the power transfer phase, and may terminate a negotiation phase or a renegotiation phase.

In particular, the wireless power receiver 1002 may request a change of characteristic information related to FSK using SRQ.

FIG. 15 is a diagram illustrating a format of a message field of an SRQ according to an example, and FIG. 16 is a diagram illustrating a format of a parameter field of an SRQ according to an example for requesting a change of characteristic information related to FSK.

Referring to FIG. 15, the message field of the SRQ may include a byte B0 including a Request field and a byte B1 including a Parameter field.

The Request field of the SRQ (SRQ/fsk) for requesting a change in the characteristic information related to the FSK may have a value of 0x03, and the Request field may include information on NCYCLES, Polarity, and Depth related to the FSK.

The NCYCLES field may consist of 2 bits, and the value of the NCYCLES field and the number of cycles of the operating frequency representing one data bit may correspond as follows.

'00'b=512 (default), '01'b=256, '10'b=128, '11'b=64

Although FIG. 16 shows an example in which the NCYCLES field is composed of 2 bits, the NCYCLES field may be composed of 3 bits or more according to an embodiment. For example, if the NCYCLES field consists of 3 bits, the value of the NCYCLES field and the number of cycles of the operating frequency representing one data bit may correspond as follows.

'000'b=512 (default), '001'b=256, '010'b=128, '011'b=64, '100'b=32, '101'b=16, '110'b=8, '111'b=4

After receiving the SRQ/fsk, the wireless power transmitter 1001 transmits an ACK to the wireless power receiver 1002 in response to the SRQ/fsk, subsequent data with FSK applied according to the information of NCYCLES, Polarity, and Depth included in SRQ/fsk is transmitted. Here, the subsequent data includes a data packet transmitted by the wireless power transmitter 1001 and a response to the data packet received from the wireless power receiver 1002.

On the other hand, when a new NCYLCES of FSK is set using SRQ/fsk, the timing at which the wireless power transmitter 1001 transmits a message to which the new NCYLCES is applied may be a problem.

Figure 17:
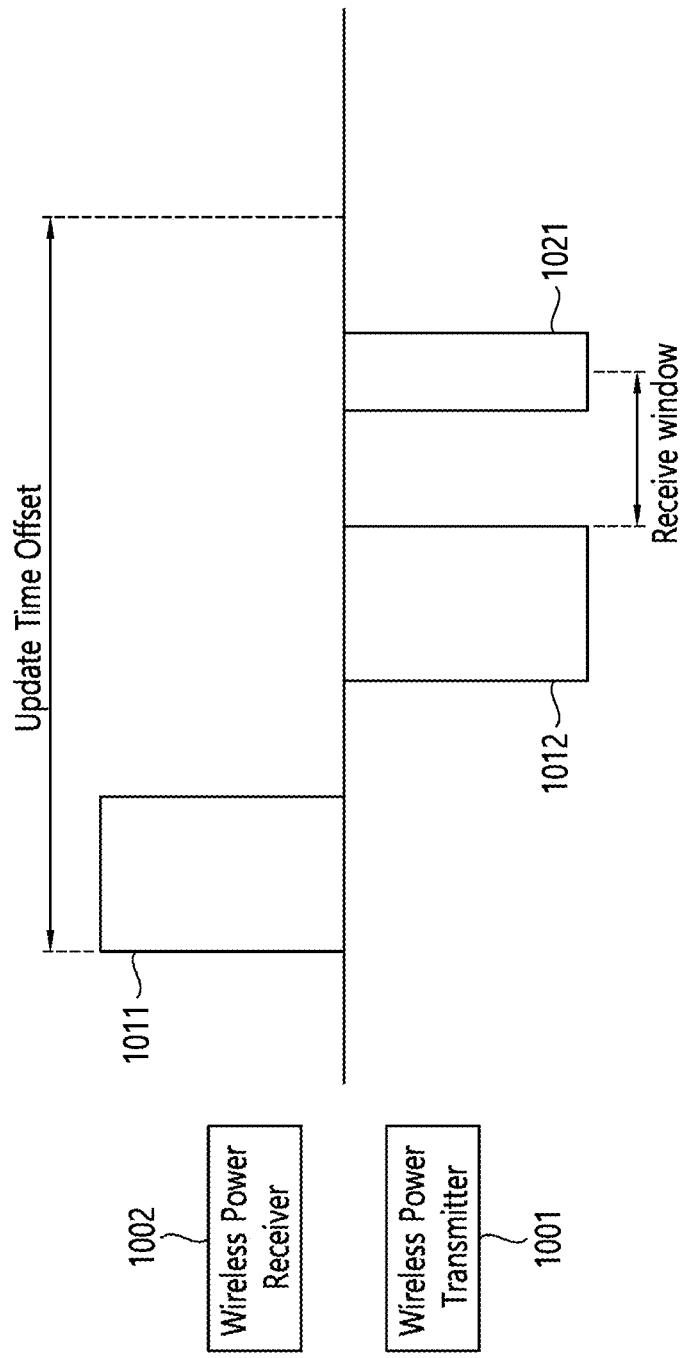
FIG. 17 is a diagram for explaining a method of solving a transmission timing of a message to which a new NCYL-CES is applied according to an embodiment.

FIG. 17 is a diagram for explaining a method of solving a transmission timing of a message to which a new NCYLCES is applied according to an embodiment.

Referring to FIG. 17, the wireless power receiver 1002 transmits a request packet 1011 requesting a new number of cycles (NCYCLES) of the FSK to the wireless power transmitter 1001 using, for example, SRQ/fsk. The request packet 1011 may include information on the number of new cycles NCYCLES.

The wireless power transmitter 1001 receiving the request packet 1011 from the wireless power receiver 1002 transmits a response 1012 to the request packet 1011 to the wireless power receiver 1002, and subsequent data 1021 is transmitted to the wireless power receiver 1002 using FSK based on the number of cycles included in the request packet 1011.

Referring to FIG. 17, the first subsequent data 1021 to which the new cycle number is applied may need to be transmitted or received within a certain time limit (Update Time Offset) from the time the request packet 1011 is transmitted or received.

Alternatively, the first subsequent data 1021 to which the new cycle number is applied may have to be transmitted or received within a certain time limit (Receive window) from the time when the response 1012 to the request packet 1011 is transmitted or received.

The first subsequent data 1021 to which the new cycle number is applied may have to be transmitted or received within a time that satisfies both the Update Time Offset and the Receive window.

If the wireless power receiver 1002 does not receive subsequent data 1021 other than the response 1012 to the request packet 1011 within the Update Time Offset and/or the Receive window, again, a request packet 1011 requesting a new cycle number NCYCLES of FSK may be transmitted to the wireless power transmitter 1001.

Figure 18:
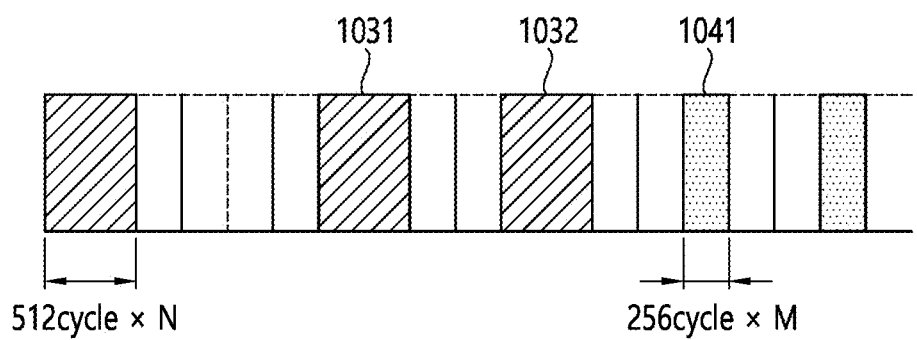
FIG. 18 is a diagram for explaining a method of solving a transmission timing of a message to which a new NCYL-CES is applied according to another embodiment.

FIG. 18 is a diagram for explaining a method of solving a transmission timing of a message to which a new NCYLCES is applied according to another embodiment.

Referring to FIG. 18, the wireless power receiver and the wireless power transmitter may communicate using cycle sub-rating.

In this case, the wireless power receiver and the wireless power transmitter operate based on a unit cycle set based on the minimum number of cycles (e.g., 64 cycles) of the FSK, the effective cycle for actually exchanging data packets can be an integer multiple of the unit cycle.

Referring to FIG. 18, the wireless power transmitter receives a cycle sub-rate request packet 1031 from the wireless power receiver while transmitting a data packet or response based on 512 cycles. The wireless power receiver may request a new cycle number NCYCLES of the FSK by transmitting a cycle sub-rate request packet 1031. In the cycle sub-rate request packet 1031, information on the number of new cycles (NCYCLES), packet exchange interval, timeout in communication to which the new number of cycles (NCYCLES) is applied, etc. may be included.

The wireless power transmitter transmits a response 1032 to the received cycle sub-rate request packet 1031 to the wireless power receiver, it sets a reference timing to transmit subsequent data Based on information on a new cycle number (NCYCLES) included in the cycle sub-rate request packet 1031, a packet exchange interval, a timeout in communication to which the new cycle number (NCYCLES) is applied, etc., and it may transmit subsequent data 1041 encoded according to a new cycle number (e.g., 256 cycles) to the wireless power receiver based on the set reference timing.

When using cycle sub-rate, since the wireless power receiver and the wireless power transmitter transmit/receive data by setting the reference timing based on the unit cycle and the effective cycle, there is no need to set a separate anchor point for transmission/reception timing of data to which a new number of cycles (NCYCLES) is applied. Therefore, there is no need to set Update Time Offset or Receive window.

On the other hand, as described above, in the case of adjusting the FSK communication speed by adjusting the number of cycles of the operating frequency representing one data bit in communication using FSK, a timeout required for the wireless power transmitter and/or the wireless power receiver also needs to be adjusted.

For example, the current WPC Qi standard stipulates that one data bit is aligned at 512 cycles of the operating frequency, but when the FSK communication speed is increased by making the number of cycles of the operating frequency representing one data bit less than 512 cycles, the time-out time may also be reduced correspondingly.

That is, by adjusting the number of cycles of the operating frequency representing one data bit, when the communication speed of the FSK increases, the timeout time may decrease, and if the communication speed of the FSK becomes slow, the timeout time may increase. For example, the timeout time may be adjusted to be proportional to the number of cycles of the operating frequency representing one data bit.

Figure 19:
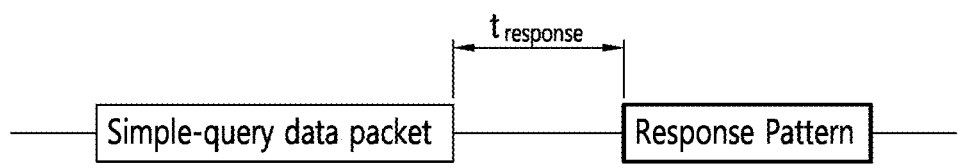
FIG. 19 and FIG. 20 are diagrams for explaining an example of a timeout time required for a wireless power transmitter.
Figure 20:
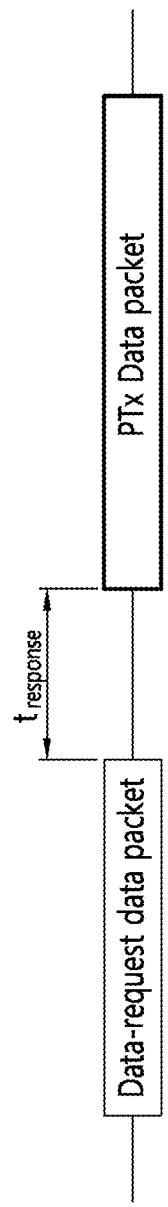

FIG. 19 and FIG. 20 are diagrams for explaining an example of a timeout time required for a wireless power transmitter.

Referring to FIG. 19, in order for the wireless power transmitter to transmit a response pattern to a simple-query data packet, transmission of the response pattern should start within the timeout time ($t_{responce}$) from the end of the simple query data packet.

Referring to FIG. 20, in transmitting a data packet for a data-request data packet, the wireless power transmitter transmits a response pattern within a timeout time ($t_{responce}$) from the end of the data request data packet.

For example, when the number of cycles of the operating frequency representing one data bit is 512 cycles, the $t_{responce}$ may be 3 to 10 ms. However, if the number of cycles of the operating frequency representing one data bit is set to be less than 512 cycles, the minimum value of $t_{responce}$ may be adjusted to be less than 3 ms, or the maximum value may be adjusted to be less than 10 ms.

By reducing the timeout time required for a wireless power transmitter and/or a wireless power receiver as the speed of FSK is improved, it is possible to shorten the time required to proceed with the protocol for wireless charging between the wireless power transmitter and the wireless power receiver.

On the other hand, as described above, in the case of adjusting the FSK communication speed by adjusting the number of cycles of the operating frequency representing one data bit in communication using FSK, a power signal termination time required for the wireless power transmitter also needs to be adjusted.

For example, the current WPC Qi standard stipulates that one data bit is aligned at 512 cycles of the operating frequency, but when the FSK communication speed is increased by making the number of cycles of the operating frequency representing one data bit less than 512 cycles, the power transmission interruption time can also be reduced correspondingly.

That is, by adjusting the number of cycles of the operating frequency representing one data bit, if the communication speed of FSK increases, the power transmission interruption time may decrease, and if the communication speed of FSK becomes slow, the power transmission interruption time may increase. For example, the power transfer interruption time may be adjusted to be proportional to the number of cycles of the operating frequency representing one data bit.

Figure 21:
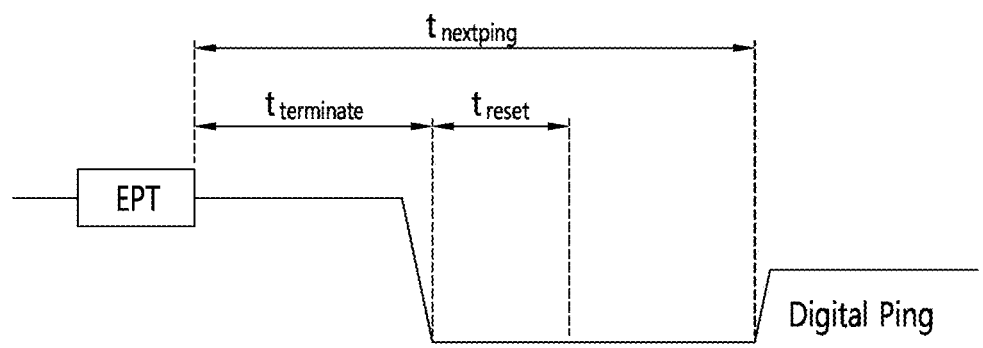
FIG. 21 is a diagram for explaining an example of a power transmission interruption time required for a wireless power transmitter.

FIG. 21 is a diagram for explaining an example of a power transmission interruption time required for a wireless power transmitter.

Referring to FIG. 21, the wireless power transmitter needs to remove the power signal from the end of the EPT (End Power Transfer data packet) within a power transmission interruption time ($t_{terminate}$).

For example, when the number of cycles of the operating frequency representing one data bit is 512 cycles, the $t_{terminate}$ may be up to 28 ms. However, if the number of cycles of the operating frequency representing one data bit is set to be less than 512 cycles, the maximum value of $t_{terminate}$ may be adjusted to be less than 28 ms.

In FIG. 21, $t_{terminate}$ required in connection with the reception of the EPT is taken as an example, if an illegal data packet or a data packet with an illegal value is received, the $t_{terminate}$ time required from the termination of the illegal data packet or data packet with illegal value to the removal of the power signal may also be adjusted according to the number of cycles of the operating frequency representing one data bit.

In addition, when the power transmission interruption time required until the power signal is removed from the wireless power transmitter is required according to various other circumstances, the corresponding power transmission interruption time may be adjusted according to the number of cycles of the operating frequency representing one data bit.

On the other hand, in addition to the case where the speed of FSK communication is improved by adjusting the number of cycles of the operating frequency representing one data bit, when the wireless power transmitter and the wireless power receiver transmit/receive a response or data packet through out-band communication, compared to the case of sending/receiving a response or data packet through in-band communication, the required timeout time and/or power transmission interruption time may be set to be short.

Hereinafter, a fast authentication method between the wireless power transmitter and the wireless power receiver will be described.

The wireless power transmitter and the wireless power receiver check whether Qi is certified, and only when Qi certification is confirmed, the profile of transmitted/received wireless power can be switched from BPP (Baseline Power Profile) to EPP (Extended Power Profile). If the Qi authentication is not confirmed, the wireless power profile may be maintained as BPP or the wireless power transmission/reception may be stopped.

One of the wireless power transmitter and the wireless power receiver may operate as an authentication initiator for initiating an authentication protocol, and the other may operate as an authentication responder.

Through the authentication protocol, the authentication initiator requests certificate chain digests from the authentication responder, reads the authentication responder's certificate chain, and performs a challenge to prove the authenticity of the authentication responder.

The authentication of the authentication responder mainly proceeds with certificate exchange and authentication of the certificate using a key (hereinafter, key authentication). That is, the authentication of the authentication responder is successful only when the authentication responder's certificate exchange and key authentication are both successful.

The wireless power transmitter and the wireless power receiver may perform an authentication protocol through out-band communication. The authentication initiator may store and manage the ID of the authentication responder who successfully acquired the certificate. When Bluetooth Low Energy (BLE) is used for out-band communication, the authentication initiator manages the authentication responder's BLE MAC address as a white list, it can be managed by indicating the success or failure of authentication of the authentication responder. Accordingly, the authentication initiator can distinguish and manage whether the certificate is exchanged with the authentication responder and whether the key authentication is successful.

If authentication is performed again between the wireless power receiver and the wireless power transmitter, which have already succeeded in authentication at least once in the past, when the authentication procedure is performed through out-band communication using BLE, the authentication initiator may use an advertisement packet of the authentication responder to check whether the authentication responder is already authenticated.

For example, when the wireless power receiver is the authentication initiator and the wireless power transmitter is the authentication responder, the wireless power transmitter transmits an advertisement packet including its BLE ID to the wireless power receiver, the wireless power receiver checks the BLE ID of the wireless power transmitter, the white list it owns, and whether the authentication is successful, it is possible to determine whether a certificate has been exchanged with the wireless power transmitter in the past and whether the wireless power transmitter has succeeded in authentication.

If the authentication responder is a device that has performed certificate exchange in the past, the authentication initiator skips the process of obtaining the authentication responder's certificate, key authentication can be performed based on the previously exchanged certificate. In this case, since the procedure for obtaining a certificate is omitted, the authentication protocol can be completed more quickly.

In addition, when the authentication procedure is performed using the out-band, the authentication initiator can identify the history of the authentication responder belonging to the white list and successful authentication, and the authentication responder can omit the key authentication procedure. Accordingly, since the procedure for obtaining a certificate from the authentication responder and the key authentication procedure are omitted, the authentication protocol can be completed more quickly.

On the other hand, when authentication is performed again between the wireless power receiver and the wireless power transmitter, which have already succeeded in authentication at least once in the past, when the authentication procedure is performed through in-band communication, the authentication initiator can request DIGEST information from the authentication responder to determine whether a certificate has been previously exchanged. However, with only DIGEST information, it is not possible to check whether the authentication responder actually succeeded in key authentication. However, for the efficiency of the authentication procedure, the authentication initiator may omit the key authentication procedure when the DIGEST information of the authentication responder is verified. However, because omitting the key authentication procedure only with DIGEST information may cause security problems, if key authentication fails despite the exchange of the certificate, whether to exchange the certificate is marked as Fail, next time, when performing the authentication procedure with the same device again, the security problem can be solved by implementing the DIGEST information to be invalid.

Hereinafter, authentication between the wireless power receiver and the wireless power transmitter using an external server will be described.

Figure 22:
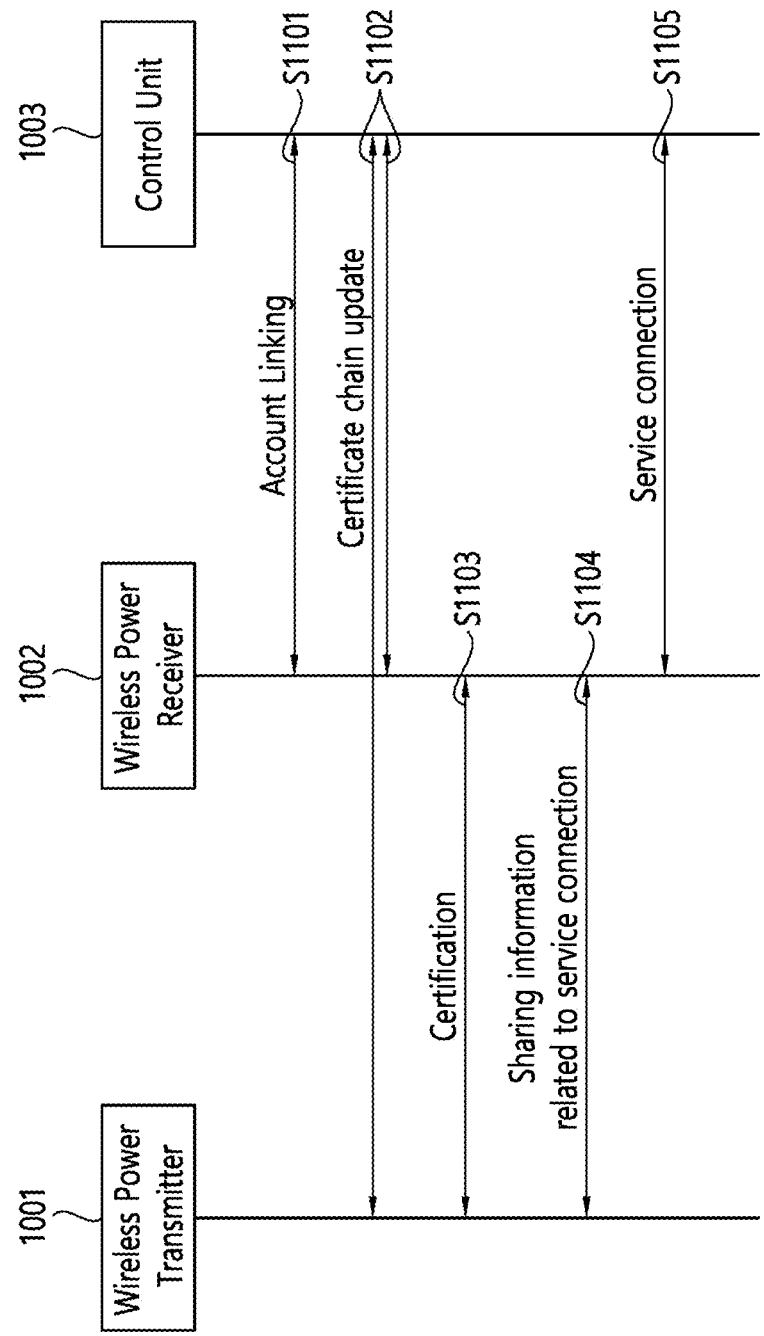
FIG. 22 is a flowchart illustrating an authentication method between a wireless power receiver and a wireless power transmitter using an external server according to an embodiment.

FIG. 22 is a flowchart illustrating an authentication method between a wireless power receiver and a wireless power transmitter using an external server according to an embodiment.

Referring to FIG. 22, the wireless power receiver 1002 links accounts through communication with a separate control unit 1003 (S1101). The control unit 1003 may be a device that manages the wireless power transmitter 1001, and may be a device that can communicate with the wireless power receiver 1002 through a separate communication means such as the Internet.

The control unit 1003 in which the account is linked with the wireless power receiver 1002 updates the certificate chain (S1102). The control unit 1003 may update the certificate chain of the wireless power transmitter 1001, in addition, by transmitting the certificate chain of the wireless power transmitter 1001 to the wireless power receiver 1002 or allowing the wireless power receiver 1002 to receive the certificate chain of the wireless power transmitter 1001, authentication between the wireless power receiver 1002 and the wireless power transmitter 1001 may be performed in advance.

Then, when the wireless power receiver 1002 is seated on the wireless power transmitter 1001 to receive wireless power from the wireless power transmitter 1001, an authentication procedure may be performed between the wireless power receiver 1002 and the wireless power transmitter 1001 (S1103). However, since the wireless power receiver 1002 has already checked the certificate chain of the wireless power transmitter 1001 in step S1102, the authentication in step S1103 may be simplified or omitted.

For example, since the wireless power receiver 1002 has already checked the certificate chain of the wireless power transmitter 1001, in step S1103, the process of requesting and receiving the certificate chain of the wireless power transmitter 1001 may be omitted, and the authentication process may be performed by checking the DIGEST information.

Or, as described above, the wireless power receiver 1002 classifies the wireless power transmitter 1001 that has already received the certificate chain as a white list device and classifies it as a device for which authentication has been successful. A procedure for obtaining a certificate from the wireless power transmitter 1001 and a key authentication procedure may be omitted.

That is, the wireless power receiver 1002 can simplify or omit an authentication procedure with the wireless power transmitter 1001 and quickly receive wireless power according to the EPP.

In step S1102, the certificate of the wireless power transmitter 1001 provided by the control unit 1003 may additionally define the validity period of the certificate. Accordingly, authentication between the wireless power receiver 1002 and the wireless power transmitter 1001 may be valid only within the valid period.

When the wireless power receiver 1002 and the wireless power transmitter 1001 are capable of out-band communication (e.g., BLE), the wireless power transmitter 1001 may notify the authentication information to the nearby wireless power receiver 1002 through out-band communication.

On the other hand, after the authentication between the wireless power receiver 1002 and the wireless power transmitter 1001 through step S1103 is successfully completed, the wireless power receiver 1002 and the wireless power transmitter 1001 may share service connection related information (S1104).

When the wireless power receiver 1002 uses a service other than wireless charging (e.g., Wi-fi, audio, video mirroring, etc.), the wireless power transmitter 1001 or the control unit 1003 may share information required for service use with the wireless power receiver 1002.

For example, when the service that the wireless power receiver 1002 wants to use is Wi-Fi connection Internet use, device ID and channel information required for DPP (Wi-Fi Device Provisioning Protocol) required for Wi-Fi connection may be shared. In the case of channel information, channel information to be used in the procedure can be exchanged for the case of exchanging a Wi-Fi-based public key (2.4 GHz Channel6: 2.437 GHz, 5 GHZ Channel 44: 5.220 GHz, 60 GHz Channel2: 60.48 GHz, etc.). This utilizes Qi authentication to omit the service authentication procedure for service connection and enables service connection and service use (S1105).

For convenience of explanation, an example in which the control unit 1003 performs all of the account interlocking with the wireless power receiver 1002, updating the certificate chain, and service connection and provision is illustrated and described based on this, the control unit 1003 may be configured as a combination of independent devices for each function. For example, a device that performs account linkage, certificate chain update, and service connection and provision may be configured separately.

The embodiment of FIG. 22 may be applied to a service providing a seat equipped with the wireless power transmitter 1001 in a cafe, a movie theater, a bus, an airplane, and the like. In this case, the wireless power receiver 1002 connects with the control unit 1003 that provides a service through account input, it completes authentication with the wireless power transmitter 1001 before the user of the wireless power receiver 1002 sits on the seat, in a state in which the wireless power receiver 1002 and the wireless power transmitter 1001 actually contact or establish communication, at least a part of the authentication procedure is omitted or the entire authentication process is omitted, receiving wireless power from the wireless power transmitter 1001 is allowed, or reception of wireless power according to the EPP may be allowed.

In addition, on the premise of successful authentication between the wireless power transmitter 1001 and the wireless power receiver 1002, the wireless power receiver 1002 may receive a separate service other than wireless charging.

Figure 23:
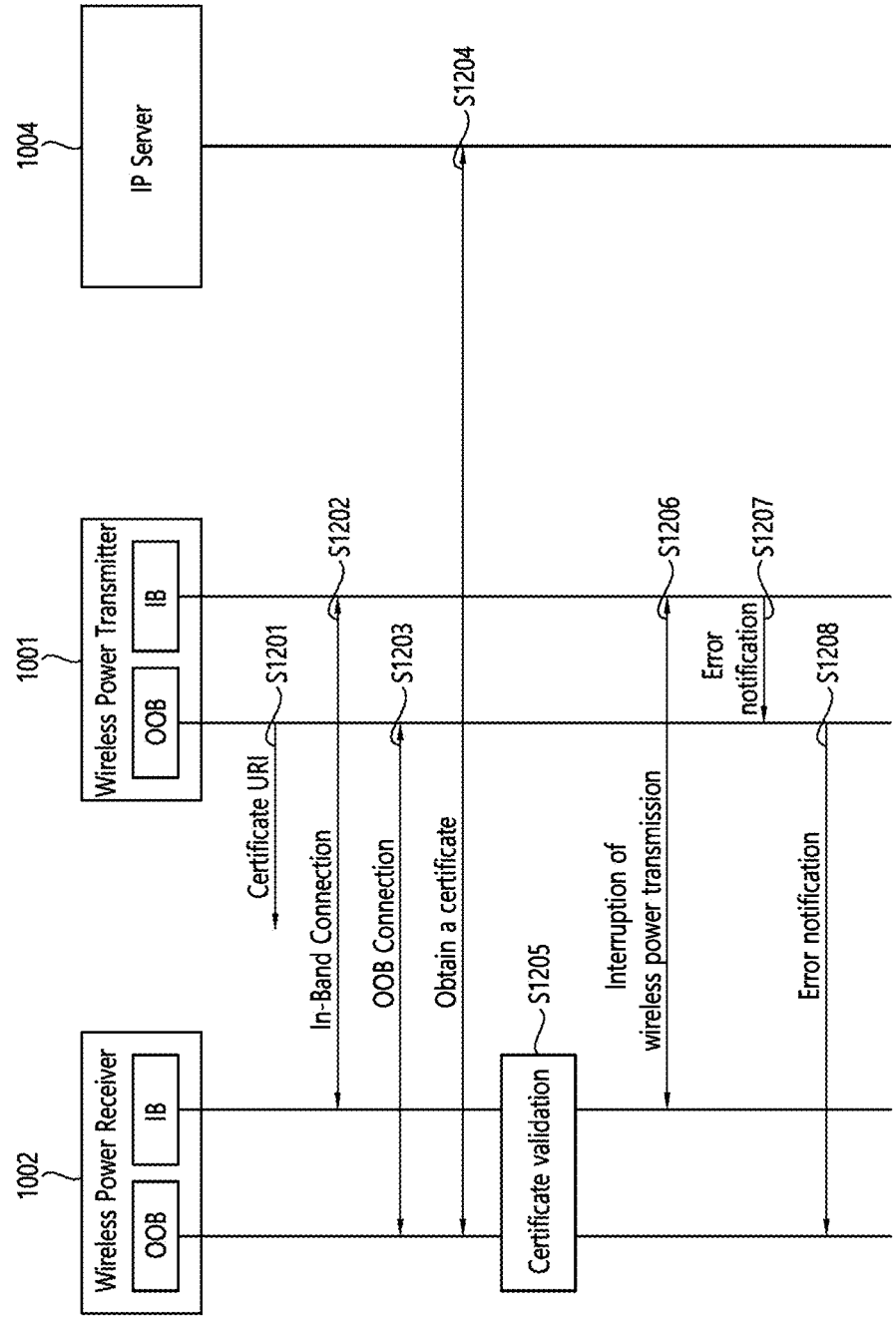
FIG. 23 is a flowchart illustrating an authentication method between a wireless power receiver and a wireless power transmitter using an external server according to another embodiment.

FIG. 23 is a flowchart illustrating an authentication method between a wireless power receiver and a wireless power transmitter using an external server according to another embodiment.

Referring to FIG. 23, the wireless power transmitter 1001 and the wireless power receiver 1002 are capable of in-band (IB) communication and out-of-band (OOB) communication.

The wireless power transmitter 1001 transmits a certificate uniform resource identifier (URI) to the wireless power receiver 1002 through out-band communication (S1201). When the wireless power transmitter 1001 and the wireless power receiver 1002 use BLE as out-band communication, the wireless power transmitter 1001 may include a certificate URI in an advertisement packet for establishing a BLE channel and transmit it. Alternatively, the wireless power transmitter 1001 may transmit the certificate URI to the wireless power receiver 1002 through in-band communication.

On the other hand, when the wireless power receiver 1002 is seated on the wireless power transmitter 1001, an in-band communication channel is established between the wireless power receiver 1002 and the wireless power transmitter 1001 (S1202), a protocol for wireless power transmission is started. In addition, an out-band communication channel between the wireless power transmitter 1001 and the wireless power receiver 1002 is also established (S1203).

Although FIG. 23 shows that step S1202 is performed after step S1201, the relationship between steps S1201 and S1202 may be changed.

The wireless power receiver 1002 obtains a certificate of the wireless power transmitter 1001 from the IP server 1004 using the certificate URI of the wireless power transmitter 1001 obtained in step S1201 (S1204). The wireless power receiver 1002 may acquire a private key related to the certificate of the wireless power transmitter 1001 from the IP server 1004, a root CA certificate, an intermediate CA certificate, a device certificate, and the like.

FIG. 23 shows that the wireless power receiver 1002 obtains the certificate of the wireless power transmitter 1001 from the IP server 1004 through out-band communication, out-band communication for obtaining a certificate of the wireless power transmitter 1001 is not limited to an out-band communication channel established in relation to the wireless power transmitter 1001. In addition, the wireless power receiver 1002 may access the IP server 1004 through the Internet, etc. The IP server 1004 may be accessed through a separate communication intermediary (e.g., an IP router, etc.).

The wireless power receiver 1002 verifies the certificate of the wireless power transmitter 1001 obtained in step S1204 (S1205). Details of the certificate verification procedure will be described later.

When authentication for the wireless power transmitter 1001 is successful based on the certificate of the wireless power transmitter 1001, the wireless power receiver 1002 may receive wireless power from the wireless power transmitter 1001 or extend the received wireless power from BPP to EPP.

However, if the certificate of the wireless power transmitter 1001 is invalid or it is impossible to obtain the certificate in step S1204, if the time limit required to obtain a certificate has been exceeded, if the wireless power receiver 1002 is moved away from the wireless power transmitter 1001 or is moved out of the range where wireless charging is possible, etc., the wireless power receiver 1002 may request to stop wireless power transmission to the wireless power transmitter 1001 or block wireless power reception (S1206).

The in-band communication element (eg, a transmission coil, etc.) of the wireless power transmitter 1001 is an out-band communication element of the wireless power transmitter 1001 and informs that an error such as authentication failure or power transmission interruption has occurred (S1207), the wireless power transmitter 1001 may notify the occurrence of an error to the wireless power receiver 1002 through out-band communication (S1207). The wireless power receiver 1002 receiving the error occurrence from the wireless power transmitter 1001 may notify the user of the error occurrence state through a display, vibration, sound, or the like.

Figure 24:
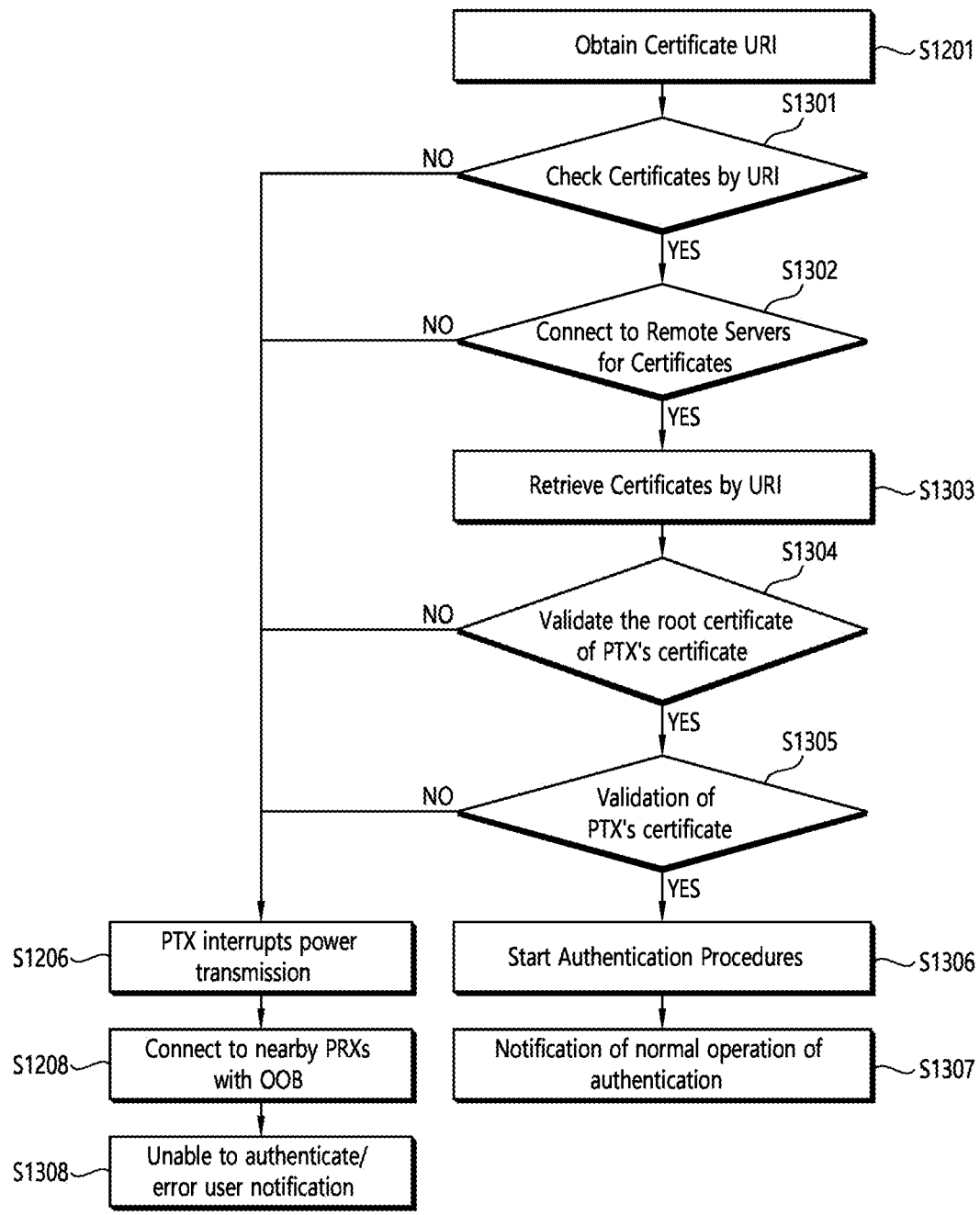
FIG. 24 is a flowchart for explaining step S1205 of FIG. 23 in more detail.

FIG. 24 is a flowchart for explaining step S1205 of FIG. 23 in more detail.

Referring to FIG. 24, as described above, the wireless power receiver 1002 obtains a certificate URI of the wireless power transmitter 1001 (S1201).

In the step of verifying the certificate of the wireless power transmitter 1001 (S1205), the wireless power receiver 1002 checks the certificate based on the URI (S1301). In step S1301, the wireless power receiver 1002 may check validity of URI information, possibility of obtaining certificate information through URI, validity of Certificate URI Hash information, and the like.

As a prerequisite for step S1201 or step S1301, the wireless power receiver 1002 and/or the wireless power transmitter 1001 may precede firmware update of the device and confirmation of a communication means (in-band communication or out-band communication) for certificate-based authentication.

In step S1301, if the validity of the URI information or the possibility of obtaining certificate information through the URI is not recognized, the process proceeds to step S1206.

In step S1301, if the validity of the URI information or the possibility of obtaining the certificate information through the URI is recognized, the wireless power receiver 1002 attempts to access the IP server based on the certificate URI (S1302). In step S1302, if access to the certificate URI is not possible or there is no access right, if there is an error downloading the certificate, if the time limit required for obtaining a certificate has been exceeded, etc., it may proceed to step S1206.

When access to the IP server is successful based on the certificate URI, the wireless power receiver 1002 obtains a certificate of the wireless power transmitter 1001 from the IP server (S1303). The wireless power receiver 1002 may acquire a private key related to the certificate of the wireless power transmitter 1001 from the IP server 1004, a root CA certificate, an intermediate CA certificate, a device certificate, and the like.

The wireless power receiver 1002 checks the validity of the root certificate from the obtained certificate (S1304). If the validity of the root certificate is not verified, the process may proceed to step S1206.

When the validity of the root certificate is checked, the wireless power receiver 1002 checks the validity of other certificates included in the obtained certificate (S1305). If the validity of the certificates is not checked in step S1305, the process may proceed to step S1206.

When the validity of all certificates is verified, the wireless power receiver 1002 may start an authentication procedure based on the certificate (S1306), and inform the user that the authentication procedure has been normally performed (S1307). The wireless power receiver 1002 may notify the user that the authentication procedure has been normally performed through a display, vibration, sound, or the like.

On the other hand, when step S1206 proceeds, the wireless power transmitter 1001 notifies the wireless power receiver 1002 and other nearby wireless power receivers that an error such as authentication failure or power transmission interruption has occurred through out-band communication (S1208), the wireless power receiver 1002 that has received the error occurrence from the wireless power transmitter 1001 may notify the user of the error occurrence state through a display, vibration, sound, or the like (S1308).

For the above-described certificate-based authentication, it may be added to the standards related to wireless charging as follows.

1) Device Capability: Additional device capability information for certificate-based authentication, which can be exchanged between a wireless power transmitter (PTx) and a wireless power receiver (PRx).

2) Device firmware update capability: Firmware update may be requested for certificate-based authentication, and whether or not to support this may be exchanged between the wireless power transmitter (PTx) and the wireless power receiver (PRx).

3) Change of Authentication Interface: In-band to in-band, Inband to OOB, etc. can be used as communication means for certificate-based authentication.

4) Auth Timer (Initiator/Responder): Maximum time allowed for authentication verification when requesting certificate-based authentication 5) Whether and how to support Re-Authentication: optionally, the wireless power receiver (PRx) can periodically determine whether the wireless power transmitter (PTx) is a previously authenticated device or whether the device has been changed.

6) Certificate Acquisition Timer: If the Certificate Acquisition Timer (TcertRetrieveTimer=expired) is exceeded, the certificate-based authentication process may be stopped.

When a new device (wireless power receiver and/or wireless power transmitter) is added to the network including the wireless power receiver 1002—the wireless power transmitter 1001—the IP server 1004, the above-described certificate-based authentication method may perform authentication by generating a new security key using the verified public key after verifying the manufacturer and device certificates for security.

In addition, a GUEST network may be temporarily configured for the new wireless power receiver 1002 so that the new wireless power receiver 1002 can acquire the certificate of the wireless power transmitter 1001 through the URI. This enables more secure isolation between unprovisioned devices and devices participating in the subnet.

Hereinafter, a method for effectively responding to the interruption of the authentication procedure will be described.

Communication between the wireless power transmitter 1001 and the wireless power receiver 1002 may be interrupted while the authentication procedure is in progress. For example, this is a case in which the wireless power receiver 1002 is separated from the wireless power transmitter 1001, a case in which a foreign object is inserted between the wireless power receiver 1002 and the wireless power transmitter 1001, or a case in which the communication link is broken due to the influence of surrounding interference, while the authentication procedure is in progress while the wireless power receiver 1002 is placed on the wireless power transmitter 1001.

When the wireless power transmitter 1001 and the wireless power receiver 1002 are in the process of authentication through out-band (OOB) communication, the wireless power receiver 1002 is separated from the wireless power transmitter 1001, or even if a foreign object is inserted between the wireless power receiver 1002 and the wireless power transmitter 1001, the authentication procedure can be continued as long as the out-band communication channel is connected. Therefore, when the wireless power receiver 1002 has a remaining battery capacity and is in a state in which the out-band communication module can be driven, the connection of the out-band communication channel with the wireless power transmitter 1001 may be maintained and the authentication procedure may be continued.

The wireless power transmitter 1001 and/or the wireless power receiver 1002 sets an authentication range that is smaller than the discovery and/or connection range of out-band communication, only when the wireless power receiver 1002 is located within the authentication range from the wireless power transmitter 1001, even if the in-band communication between the wireless power receiver 1002 and the wireless power transmitter 1001 is cut off, even if the wireless power receiver 1002 departs from the wireless power transmitter 1001, or even if a foreign object is inserted between the wireless power receiver 1002 and the wireless power transmitter 1001, the authentication process can be continued through out-band communication.

However, when the wireless power receiver 1002 is more than a certain distance away from the wireless power transmitter 1001, there is a high possibility that the user has no intention of wireless charging, so the authentication procedure may be stopped.

Whether the wireless power receiver 1002 is located within the authentication range from the wireless power transmitter 1001 may be determined based on the signal strength of in-band communication and/or out-band communication.

On the other hand, when the authentication procedure is in progress through in-band communication, if the wireless power receiver 1002 is removed from the wireless power transmitter 1001 or a foreign object is inserted between the two devices, communication is impossible.

Therefore, from the moment when the communication abnormality between the wireless power receiver 1002 and the wireless power transmitter 1001 is detected, the wireless power receiver 1002 and/or the wireless power transmitter 1001 does not terminate the authentication procedure for a certain period of time (Authentication time-out), and the authentication process may be temporarily suspended until a subsequent data packet that is continuous to the previously performed authentication process is received.

The wireless power receiver 1002 and/or the wireless power transmitter 1001 continuously continues the stopped authentication procedure when a subsequent data packet is detected within a predetermined time (Authentication time-out), and if a subsequent data packet is not detected within a certain period of time (Authentication time-out), the authentication process may be initialized and the authentication process may be restarted, or it may be treated as an authentication failure.

To this end, when the wireless power receiver 1002 and/or the wireless power transmitter 1001 stops the authentication procedure, information on data packets exchanged in an ongoing authentication procedure may be stored for a certain period of time (Authentication time-out). The stored information may be initialized after a predetermined time (authentication time-out) has elapsed.

For detection of communication anomalies, transmission/reception of an error packet transmitted by the wireless power receiver 1002 and/or the wireless power transmitter 1001 in the authentication process, detection of malfunction of the wireless power transmitter 1001, detection of a foreign object, and communication error situation, etc. may be the standard.

The wireless power transmission apparatus in the embodiment according to the above-described FIGS. 13 to 24 corresponds to the wireless power transmission apparatus or the wireless power transmitter or the power transmission unit disclosed in FIGS. 1 to 12. Accordingly, the operation of the wireless power transmitter in this embodiment is implemented by one or a combination of two or more of the respective components of the wireless power transmitter in FIGS. 1 to 12. For example, according to FIGS. 13 to 24, reception/transmission of data packets, FSK communication based on NCYCLES, adjustment of timeout and/or power transmission interruption time required for subsequent response or data packet transmission according to FSK communication speed change, carrying out the certification process, verification of authentication errors, etc. may be included in the operation of the communication/control unit 120, 710 or 790.

The wireless power receiving apparatus in the embodiment according to the aforementioned FIGS. 13 to 24 corresponds to the wireless power receiving apparatus or the wireless power receiver or the power receiving unit disclosed in FIGS. 1 to 12. Accordingly, the operation of the wireless power receiver in this embodiment is implemented by one or a combination of two or more of the respective components of the wireless power receiver in FIGS. 1 to 12. For example, according to FIGS. 13 to 24, reception/transmission of data packets, adjustment of timeout and/or power transmission interruption time required for subsequent response or data packet transmission according to FSK communication speed change based on NCYCLES, carrying out the certification process, and verification of authentication errors, etc. may be included in the operation of the communication/control unit 220, 810 or 890.

Since all components or steps are not essential for the wireless power transmission method and apparatus, or the reception apparatus and method according to the embodiment of the present specification described above, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each component or step described above does not necessarily have to be performed in the order described, it is also possible that the steps described later are performed prior to the steps described earlier.

The above description is merely illustrative of the technical spirit of the present specification, and various modifications and variations will be possible without departing from the essential characteristics of the present specification by those skilled in the art to which this specification belongs. Accordingly, the embodiments of the present specification described above may be implemented separately or in combination with each other.

Therefore, the embodiments disclosed in the present specification are for explanation rather than limiting the technical idea according to the present specification, and the scope of the technical idea according to the present specification is not limited by these embodiments. The protection scope of the present document should be construed by the following claims, and all technical ideas within the scope equivalent thereto should be construed as being included in the scope of the present document.

What is claimed is:

1. A wireless power transmitter for transferring wireless power to a wireless power receiver comprising:
- a power converter configured to transfer the wireless power to the wireless power receiver; and
- a communicator/controller configured to communicate with the wireless power receiver and control the wireless power,
- wherein the wireless power transmitter is configured to:
- initiate a digital ping to the wireless power receiver;
- receive a signal strength packet in response to the digital ping from the wireless power receiver;
- receive, from the wireless power receiver in a negotiation phase, a specific request (SRQ) data packet for a configuration of frequency shift keying (FSK),
- wherein the SRQ data packet includes information for a number of cycles that make up an FSK bit, and
- wherein the number of cycles is one of 512, 256, 128, or 64; and
- transmit, to the wireless power receiver after the negotiation phase, a data stream related to an authentication,
- wherein the wireless power transmitter communicates to the wireless power receiver based on the FSK having the number of cycles which is one of 512, 256, 128, or 64.

2. The wireless power transmitter of claim 1, wherein the SRQ data packet includes information for polarity of the FSK and information for depth of the FSK.

3. The wireless power transmitter of claim 1, wherein the wireless power transmitter transmits a data packet using the FSK based on the number of cycles.

4. A method for transferring a wireless power to a wireless power receiver, the method performed by a wireless power transmitter and comprising:
- initiating a digital ping to the wireless power receiver;
- receiving a signal strength packet in response to the digital ping from the wireless power receiver;
- receiving, from the wireless power receiver in a negotiation phase, a specific request (SRQ) data packet for a configuration of frequency shift keying (FSK),
- wherein the SRQ data packet includes information for a number of cycles that make up an FSK bit, and
- wherein the number of cycles is one of 512, 256, 128, or 64; and
- transmitting, to the wireless power receiver after the negotiation phase, a data stream related to an authentication,
- wherein the wireless power transmitter communicates to the wireless power receiver based on the FSK having the number of cycles which is one of 512, 256, 128, or 64.

5. The method of claim 4, wherein the SRQ data packet includes information for polarity of the FSK and information for depth of the FSK.

6. The method of claim 4, wherein the wireless power transmitter transmits a data packet using the FSK based on the number of cycles.

7. A method for receiving a wireless power from a wireless power transmitter, the method performed by a wireless power receiver and comprising:
- receiving a digital ping from the wireless power transmitter;
- transmitting a signal strength packet in response to the digital ping to the wireless power transmitter;
- transmitting, to the wireless power transmitter in a negotiation phase, a specific request (SRQ) data packet for a configuration of frequency shift keying (FSK),
- wherein the SRQ data packet includes information for a number of cycles that make up an FSK bit, and
- wherein the number of cycles is one of 512, 256, 128, or 64; and
- receiving, from the wireless power transmitter after the negotiation phase, a data stream related to an authentication,
- wherein the wireless power receiver performs communication within the wireless power transmitter based on the FSK having the number of cycles which is one of 512, 256, 128, or 64.

8. The wireless power transmitter of claim 1, wherein the data stream includes:
- an initial auxiliary data control (ADC) data packet opening the data stream;
- a plurality of auxiliary data transport (ADT) data packet containing an actual message; and
- a final ADC data packet closing the data stream.

9. The method of claim 4, wherein the data stream includes:
- an initial auxiliary data control (ADC) data packet opening the data stream;
- a plurality of auxiliary data transport (ADT) data packet containing an actual message; and
- a final ADC data packet closing the data stream.

10. The method of claim 7, wherein the data stream includes:
- an initial auxiliary data control (ADC) data packet opening the data stream;
- a plurality of auxiliary data transport (ADT) data packet containing an actual message; and
- a final ADC data packet closing the data stream.

* * * * *